(12) United States Patent
Wang et al.

(10) Patent No.: US 11,595,625 B2
(45) Date of Patent: Feb. 28, 2023

(54) MECHANICAL INFRARED LIGHT FILTER

(71) Applicant: QUALCOMM Incorporated, San Diego, CA (US)

(72) Inventors: Jing Wang, Milpitas, CA (US); Xiaoyun Jiang, San Diego, CA (US); Shang-Chih Chuang, San Diego, CA (US); Jiafu Luo, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 16/733,056

(22) Filed: Jan. 2, 2020

(65) Prior Publication Data

US 2021/0211616 A1 Jul. 8, 2021

(51) Int. Cl.
*H04N 9/04* (2006.01)
*H04N 5/225* (2006.01)
*H04N 5/232* (2006.01)

(52) U.S. Cl.
CPC ....... *H04N 9/04553* (2018.08); *H04N 5/2254* (2013.01); *H04N 5/23232* (2013.01); *H04N 9/04515* (2018.08)

(58) Field of Classification Search
CPC ........... H04N 9/04533; H04N 9/04515; H04N 5/2254; H04N 5/23232
See application file for complete search history.

(56) References Cited

U.S. PATENT DOCUMENTS

| 7,606,484 B1 | 10/2009 | Richards et al. | |
| 8,917,327 B1 * | 12/2014 | Bishay | H04N 5/343 |
| | | | 348/279 |
| 2012/0327207 A1 * | 12/2012 | Oe | A61B 5/0064 |
| | | | 348/77 |

(Continued)

FOREIGN PATENT DOCUMENTS

| CN | 110519489 A | 11/2019 | |
| EP | 1818855 A2 | 8/2007 | |
| WO | WO-2018219005 A1 * | 12/2018 | ............... G06T 5/00 |

OTHER PUBLICATIONS

International Search Report and Written Opinion—PCT/US2020/064870—ISA/EPO—dated Mar. 12, 2021 (192555WO).

*Primary Examiner* — Maria E Vazquez Colon
(74) *Attorney, Agent, or Firm* — Procopio, Cory, Hargreaves & Savitch LLP

(57) ABSTRACT

Apparatus for generating images using a mechanical infrared cut-off switch are disclosed herein. An example apparatus including an optical system for generating images includes a mechanical infrared light filter movable between a first position and a second position. The mechanical infrared light filter may be configured to allow infrared light to pass through the optical system while in the first position and configured to filter out infrared light from the optical system while in the second position. The example apparatus also includes an imaging sensor including imaging pixels and infrared pixels, and may be configured to receive light from the optical system. Additionally, the example apparatus (Continued)

includes a processor configured to receive visible light data and infrared light data from the image sensor. The processor may further be configured to generate a combined image based on the visible light data and the infrared light data.

28 Claims, 14 Drawing Sheets

(56) References Cited

U.S. PATENT DOCUMENTS

| | | |
|---|---|---|
| 2015/0245767 A1* | 9/2015 | Northcott ............. A61B 3/1216 |
| | | 351/206 |
| 2016/0231866 A1* | 8/2016 | Tretter .................... G06T 7/174 |
| 2018/0069995 A1 | 3/2018 | Lim et al. |
| 2018/0120661 A1* | 5/2018 | Kilgore .................. G03B 11/00 |
| 2018/0197275 A1* | 7/2018 | Price .................. H04N 9/04515 |
| 2019/0082519 A1 | 3/2019 | Gagne-Keats |
| 2019/0141238 A1* | 5/2019 | Zhou .................. H04N 9/04553 |

\* cited by examiner

MECHANICAL INFRARED LIGHT FILTER

BACKGROUND

Technical Field

The present disclosure relates generally to image processing, and more particularly, to an apparatus for generating images.

Introduction

Image capture devices, such as digital cameras and mobile devices (e.g., smartphones, tablets, laptops, etc.) include an imaging system that includes an imaging sensor positioned downstream of one or more optical components. Typical optical components may include one or more lenses and apertures. The optical components direct light of an image onto the imaging sensor, which measures the light. A processor processes the measurements made by the imaging sensor to record an image. To record a clear image, the optical components focus light from the image onto the imaging sensor.

Some image capture devices use different imaging sensors to perform different functionalities. For example, to capture a visible light image, an image capture device may include a visible light imaging sensor to collect visible light data. Additionally or alternatively, to capture an infrared light image, the image capture device may include an infrared (or near-infrared) light imaging sensor to collect infrared light data. Some image capture devices use a combined imaging sensor to perform the different functionalities (e.g., an imaging sensor that includes aspects of a visible light imaging sensor to facilitate collecting visible light data and aspects of an infrared (or near-infrared) light imaging sensor to facilitate collecting infrared light data). There is currently a need to improve color reproduction technology, including technology implemented with a combined imaging sensor.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. An example apparatus including an optical system for generating images includes a mechanical infrared light filter that is movable between a first position and a second position. The example mechanical infrared light filter may be configured to allow infrared light to pass through the optical system while in the first position, and may be configured to filter out infrared light from the optical system while in the second position. The example apparatus also includes an imaging sensor including a set of imaging pixels and a set of infrared pixels. The example imaging sensor may be configured to receive the light from the optical system. The example apparatus also includes a processor coupled to the imaging sensor and configured to receive visible light data and infrared light data from the imaging sensor. The example processor may also be configured to generate a combined image based on the visible light data and the infrared light data.

In another aspect, disclosed techniques include a method of operation for generating images. The example method includes causing a mechanical infrared light filter to move between a first position and a second position. In some examples, the mechanical infrared light filter may be configured to allows infrared light to pass through the optical system while in the first position, and may be configured to filter out infrared light from the optical system while in the second position. Additionally, the example method includes receiving, at a processor and from the imaging sensor, visible light data and infrared light data. Further, the example method includes generating a combined image based on the visible light data and the infrared light data.

In another aspect, disclosed techniques include an apparatus including an optical system for generating images. The example apparatus includes means for moving a mechanical infrared light filter between a first position and a second position. In some examples, the mechanical infrared light filter may be configured to allow infrared light to pass through the optical system while in the first position, and may be configured to filter out infrared light from the optical system while in the second position. The example apparatus also includes means for receiving light at an imaging sensor including a set of imaging pixels and a set of infrared pixels. In some examples, the imaging sensor may be configured to receive the light from the optical system.

The example apparatus also includes means for receiving visible light data and infrared light data from the imaging sensor. Additionally, the example apparatus includes means for generating a combined image based on the visible light data and the infrared light data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
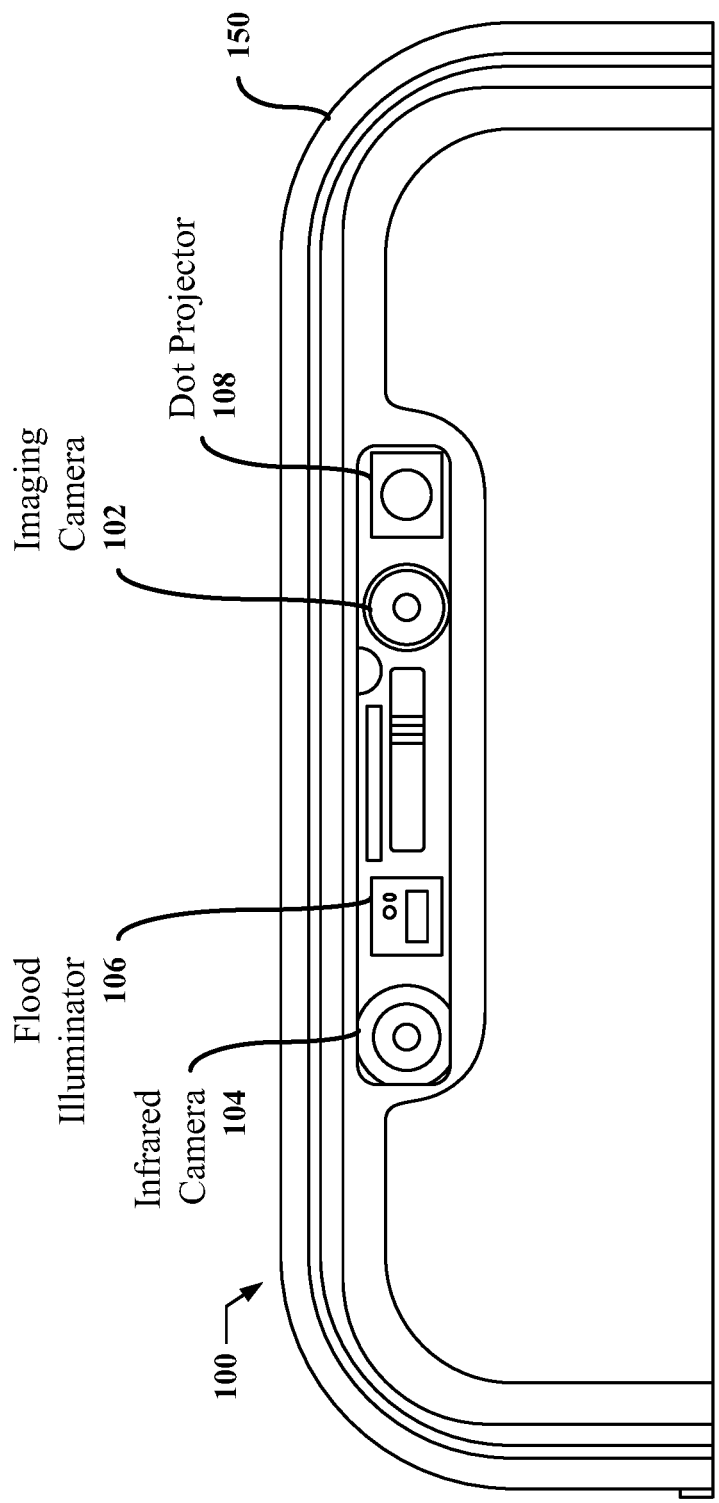
FIG. 1 illustrates an example image capture device of a mobile device, in accordance with certain aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), image signal processors (ISPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor, may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, example techniques disclosed herein are directed to techniques for improving color reproduction for images generated using a combined imaging sensor For example, a combined imaging sensor may include aspects of a visible light imaging sensor to facilitate collecting visible light data and may also include aspects of an infrared (or near-infrared) light imaging sensor to facilitate collecting infrared light data. Mobile devices or portable devices, such as smartphones, tablets, laptops, etc., may include a visible light imaging sensor (e.g., a red, green, blue (RGB) sensor) and an infrared (or near-infrared) light imaging sensor. In some examples, the infrared light imaging sensor (or infrared camera) may be used to facilitate biometric authentication, 3D mapping, image Bokeh, etc. FIG. 1 illustrates an example image capture device 100 of a mobile device 150. The example image capture device 100 includes at least an imaging camera 102, an infrared camera 104, a flood illuminator 106, and a dot projector 108. The imaging camera 102 may facilitate capturing visible light and for generating a visible light image. The dot projector 108 may facilitate projecting infrared dots onto a surface within an environment (e.g., a face, an iris, an object, etc.) to generate a map of the surface. The flood illuminator 106 (sometimes referred to as an "infrared flash") may facilitate providing infrared light so that the surface may be read in relatively low-light environments. The infrared camera 104 may facilitate reading the dot pattern and capturing an infrared light image. In some examples, the infrared light image may be used to authenticate a person. Although the illustrated example may be focused on an example image capture device 100 that uses structured light systems for depth map extraction, it may be appreciated that in other examples, the concepts described herein may be applicable to additional or alternative techniques for extracting depth maps, such as time-of-flight systems.

Figure 2:
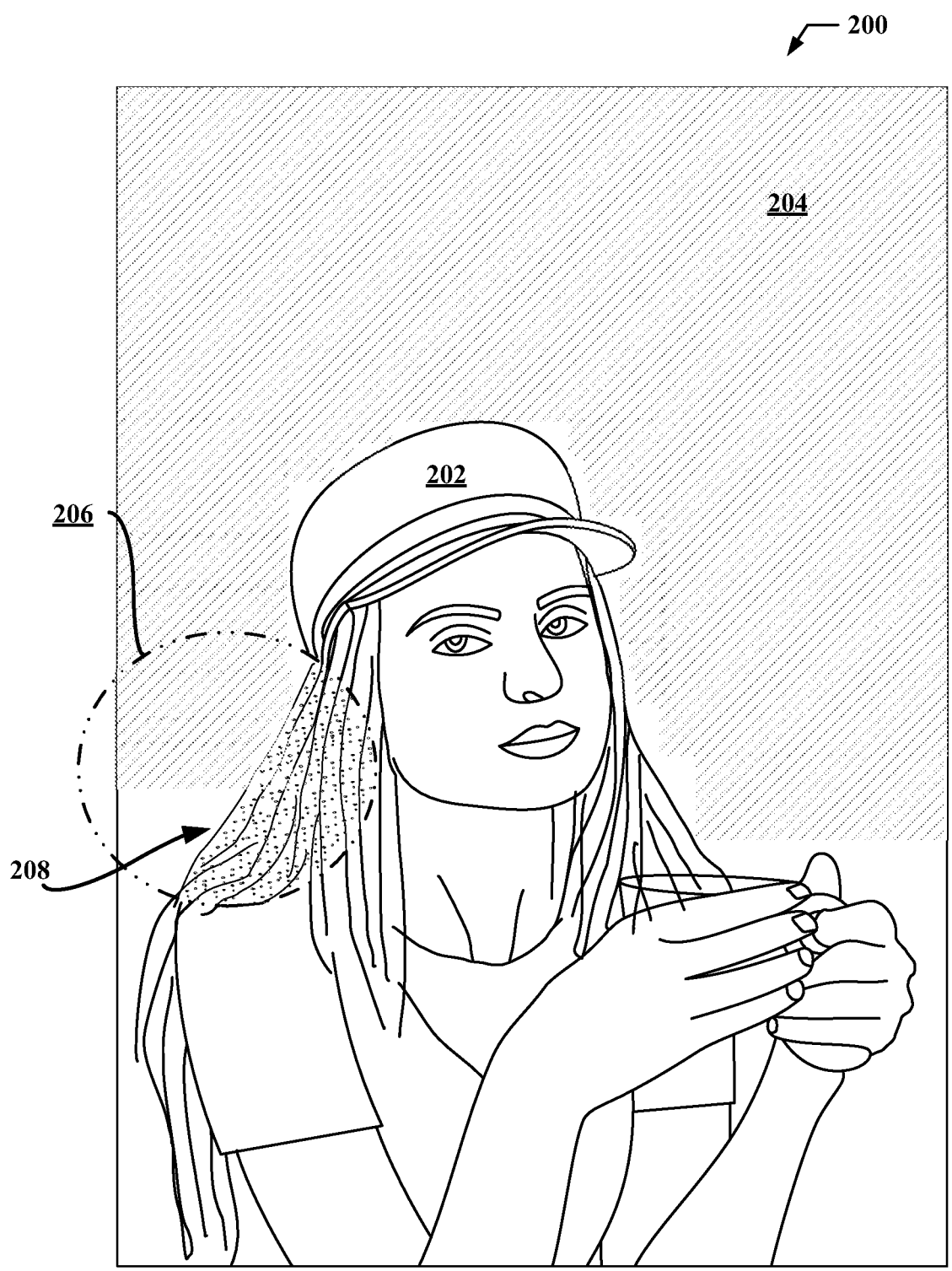
FIG. 2 depicts a visible light image including a person that is in focus, in accordance with certain aspects of this disclosure.

In some examples, the infrared camera 104, the flood illuminator 106, and the dot projector 108 may be used to facilitate capturing depth information of an environment, which may be used to facilitate 3D mapping of the environment. In some examples, the depth information may improve the performance of image Bokeh by removing visible artifacts, for example, at the border of the focused object and the blurred portion of the image. For example, FIG. 2 depicts a visible light image 200 including a person 202 that is in focus. The visible light image 200 also includes a blurred background 204. In the illustrated example of FIG. 2, a border region 206 between hair of the person 202 and the blurred background 204 may include artifacts without depth information captured by, for example, the infrared camera 104, the flood illuminator 106, and the dot projector 108. In the illustrated example of FIG. 2, artifacts 208 are depicted as dots in part of the hair of the person 202 in the border region 206.

While including a dedicated infrared light imaging sensor may be useful, it should be appreciated that there is a cost associated with including separate imaging sensors, as shown in FIG. 1. For example, including two separate cameras with two separate imaging sensors (e.g., the imaging camera 102 and the infrared camera 104) in the mobile device uses physical space and consumes processing resources to calibrate, among other costs.

Thus, some mobile devices include a single imaging sensor that can be used to capture visible and/or infrared light. For example, the mobile device may include an RGBIR sensor to capture light at visible wavelengths and/or infrared wavelengths and to output RGB information (e.g., visible light data) and/or IR information (e.g., infrared light data). The RBGIR sensor may include a dual band-pass filter having a first band allowing visible light to pass through the filter to RGBIR sensor and blocking infrared light from reaching the RGBIR sensor (or at least portions of the RGBIR sensor). The dual band-pass filter also includes a second band allowing infrared light to pass through the filter to the RGBIR sensor and blocking visible light from reaching the RGBIR sensor (or at least portions of the RGBIR sensor). In some examples, the second band may allow passage of a relatively narrow range of infrared wavelengths. Accordingly, a single imaging sensor may be used to capture image data in both visible and infrared wavelengths, for example, generating an RGB image and an infrared image. However, as discussed below, in some examples, one or both bands of the dual band-pass filter may allow some light that was intended to be blocked by the respective band to pass through the filter and reach the RGBIR sensor, thereby contaminating (or polluting) some of the RGB information and/or IR information output by the RGBIR sensor.

Figure 3B:
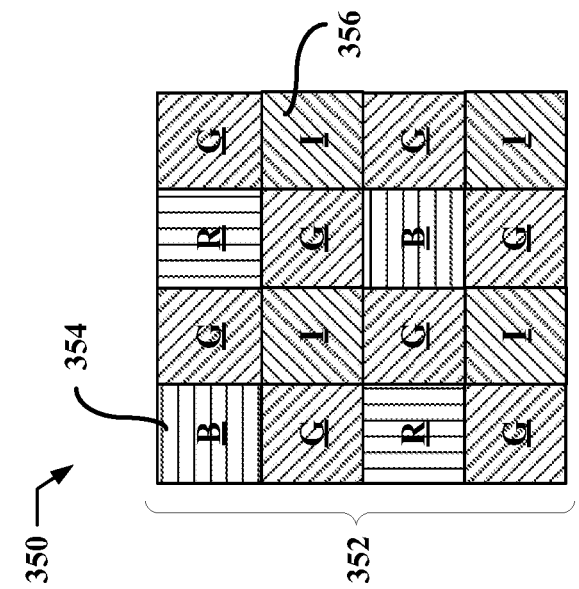
FIG. 3B illustrates an example imaging sensor for capturing visible light wavelengths and infrared light wavelengths, in accordance with certain aspects of this disclosure.
Figure 3A:
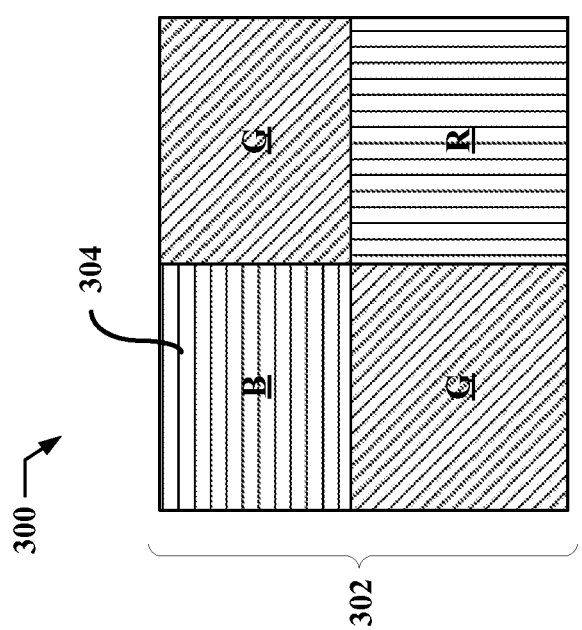
FIG. 3A illustrates an example imaging sensor for capturing visible light wavelengths, in accordance with certain aspects of this disclosure.

FIG. 3A illustrates an example imaging sensor 300 for capturing visible light wavelengths. In the illustrated example of FIG. 3A, the imaging sensor 300 includes a pixel array 302 including a plurality of imaging pixels 304. The imaging pixels 304 are arranged in a pattern according to color filters associated with the respective pixels. As used herein, an imaging pixel may be referred to as a colored imaging pixel based on the respective color filter associated with the imaging pixel. For example, a "red" type imaging pixel (or a "red" imaging pixel) may be an imaging pixel associated with a red color filter that allows red colored light to pass. In some examples, the color filters may be arranged in an array (e.g., a color filter array) and where pixels of the pixel array 302 are associated with a respective color filter of the color filter array. The imaging pixels 304 can be referred to as red, green, and blue (R, G, and B, respectively, in FIG. 3A) type imaging pixels 304 and their respective color filters arranged in a Bayer pattern. In other examples, the imaging pixels 304 may be arranged in a cyan, yellow, green, and magenta pattern (e.g., the color filters associated with the pixels of the pixel array 302 can be arranged in a cyan, yellow, green, and magenta pattern), a red, green, blue, and emerald pattern (e.g., the color filters associated with the pixels of the pixel array 302 can be arranged in a red, green, blue, and emerald pattern), a cyan, magenta yellow, and white pattern (e.g., the color filters associated with the pixels of the pixel array 302 can be arranged in a cyan, magenta, yellow, and white pattern), a red, green, blue, and white pattern (e.g., the color filters associated with the pixels of the pixel array 302 can be arranged in a red, green, blue, and white pattern), or other suitable pattern corresponding to a demosaicing algorithm used to interpolate a set of red, green, and blue values for each imaging pixel 304. Although FIG. 3A illustrates the imaging sensor 300 with four sensing elements (e.g., pixels) for ease of viewing, it should be appreciated that the imaging sensor 300 may have several million sensing elements (e.g., pixels).

However, it should be appreciated that while imaging pixels are associated with collecting RGB information, in some examples, the imaging pixels may also collect infrared information. For example, if visible light wavelengths are blocked from reaching the pixels of the imaging sensor, then the information generated by the pixels based on the light that reaches the pixels of the imaging sensor may correspond to infrared information. Thus, it should be appreciated that while the imaging pixels 304 of the RGB sensor 300 may be configured to generate RGB information based on, for example, the color filter associated with the respective pixels, in some examples, the imaging pixels 304 may generate infrared image.

FIG. 3B illustrates an example imaging sensor 350 for capturing visible light wavelengths and infrared light wavelengths. In the illustrated example of FIG. 3B, the imaging sensor 350 includes a pixel array 352 including a plurality of imaging pixels 354 (e.g., pixels associated with a color filter) and a plurality of infrared pixels 356 (e.g., pixels associated with an infrared filter). As used herein, a pixel of the pixel array 352 may be referred to as an "imaging pixel" when the respective pixel is associated with a color filter to facilitate collecting information associated with a respective visible light color. For example, a red imaging pixel is a pixel of the pixel array 352 that is associated with a red color pixel and is configured to generate red visible light information. As used herein, a pixel of the pixel array 352 may be referred to as an "infrared pixel" when the respective pixel is associated with a filter configured to allow infrared (or near-infrared) light to reach the respective pixel. For example, an infrared pixel is a pixel of the pixel array 352 that is associated with a filter (e.g., a band of the dual band-pass filter) that allows infrared light to pass the filter and that blocks (or attempts to block) visible light from passing through the filter. The pixels 354, 356 are arranged in a pattern according to their wavelength regions. The imaging pixels 354 can be red, green, and blue (R, G, and B, respectively, in FIG. 3B) type imaging pixels 354 arranged in a pattern along with the infrared pixels 356. However, it should be appreciated that additional or alternative examples may use other patterns for arranging the imaging pixels 354 and the infrared pixels 356. Although FIG. 3B illustrates the imaging sensor 350 with sixteen sensing elements (e.g. pixels in a 4×4 pattern) for ease of viewing, it should be appreciated that the imaging sensor 350 may have several million sensing elements.

As used herein, infrared refers to the region of the electromagnetic spectrum ranging from wavelengths of approximately 800 nm to 900 nm (nanometers). However, it should be appreciated that the infrared (or near-infrared) may refer to the region from wavelengths of 750 nm and 800 nm to approximately 2500 nm. The red, green, and blue channels of RGB image data, as used herein, refer to wavelength ranges roughly following the color receptors in the human eye. While the exact beginning and ending wavelengths that define colors of visible light (or infrared light) are not typically defined, it should be appreciated that the wavelengths ranging from around 750 nm to 380 nm are typically considered the "visible" spectrum. For example, a red channel of an RGB image may include wavelengths from approximately 625 nm to 740 nm. A green channel of an RGB image may include wavelengths from approximately 520 nm to 565 nm. A blue channel of an RGB image may include wavelengths from approximately 430 nm to 500 nm.

Figure 4:
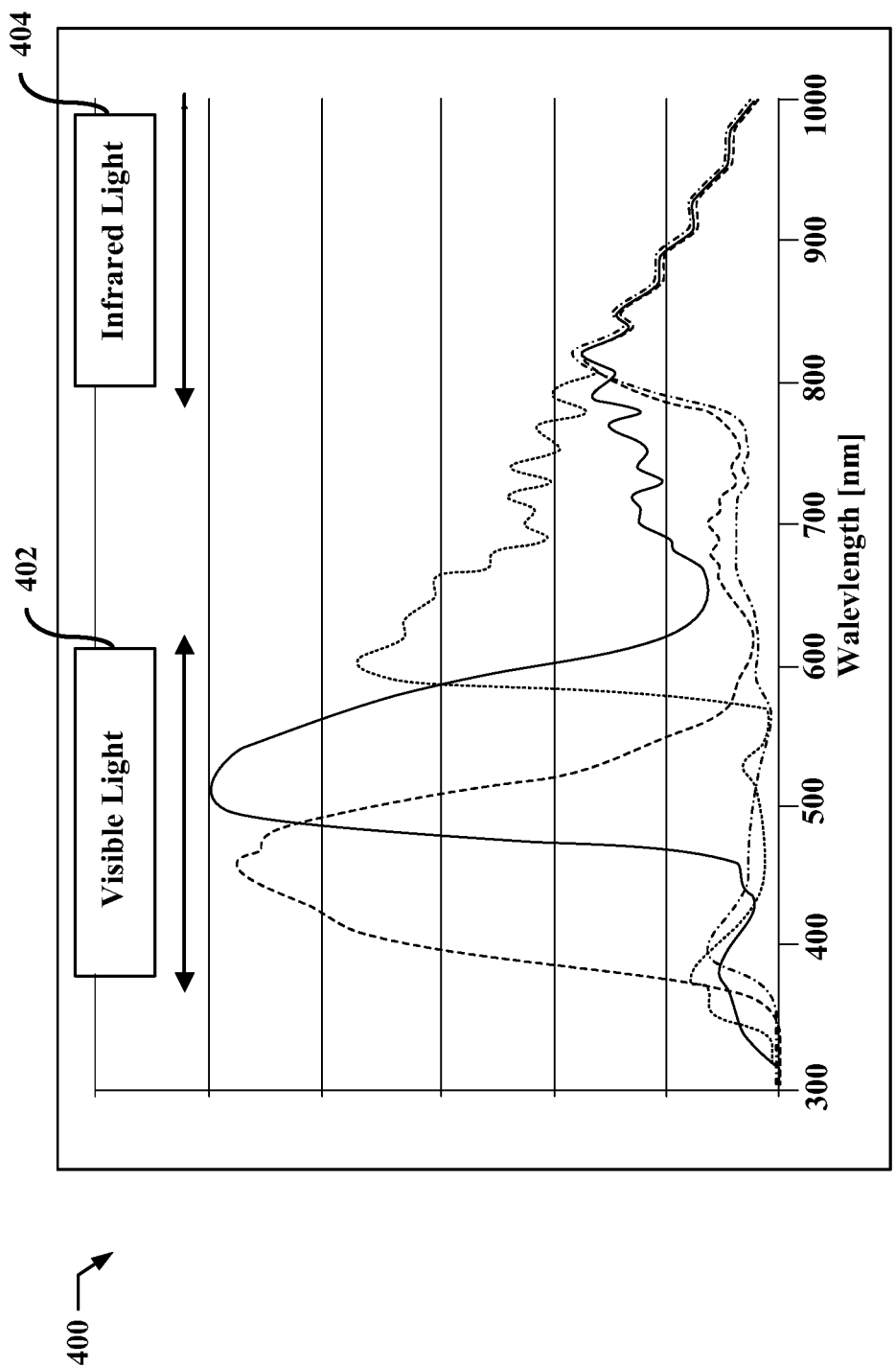
FIG. 4 illustrates an example graph depicting the regions of visible light and infrared light in relation to wavelength (nm), in accordance with certain aspects of this disclosure.

FIG. 4 illustrates an example graph 400 depicting the regions of visible light 402 and infrared light 404 in relation to wavelength (nm).

Figure 5:
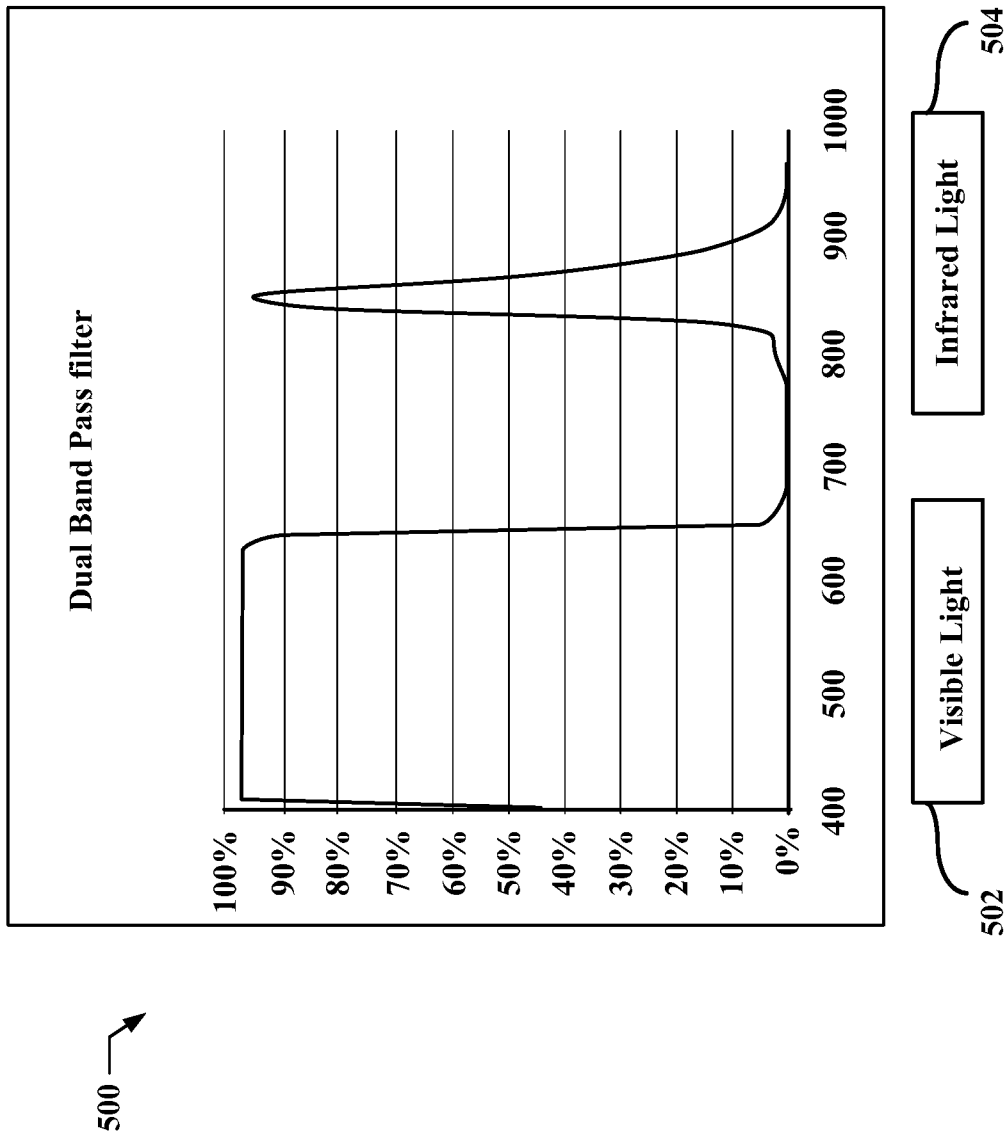
FIG. 5 illustrates an example graph depicting how much light may pass through a dual band-pass filter of an RGBIR sensor at different wavelengths.

FIG. 5 illustrates an example graph 500 depicting how much light may pass through a dual band-pass filter of an RGBIR sensor at different wavelengths. For example, the graph 500 illustrates a visible light region 502 corresponding to a region allowing visible light to pass through the dual band-pass filter to the RGBIR sensor and an infrared light region 504 corresponding to a region allowing infrared light to pass through the dual band-pass filter to the RGBIR sensor.

However, as shown in FIGS. 4 and 5, it should be appreciated that in some examples, the RGB imaging pixels of the RGBIR sensor may collect infrared signals. In some examples, it may be difficult to determine, for example, how much energy of a blue channel is from the blue pixels of the RGBIR sensor and how much energy of the blue channel is from the infrared pixel. In some such examples, colors in an RGB image generated by an RGBIR sensor may be "contaminated" with the infrared signals resulting in an RGB image with relatively lower accuracy in reproducing the colors of a scene than an RGB image generated by an RBG sensor.

Example techniques disclosed herein describe an image capture device that includes a mechanical infrared cut-off switch for selecting an infrared light filter when capturing an image. As used herein, an infrared light filter is a filter that blocks the transmission of infrared light through an optical system while allowing visible light to pass through the optical system. For example, the infrared light filter (sometimes referred to as an "infrared cut-off filter") may be positioned between a lens and the RGBIR sensor of an optical system of an image capture device, such as in a mobile device. The infrared light filter may be controlled via an actuator that may move the infrared light filter between a first position and a second position. For example, while the actuator positions the infrared light filter at the a first position (or an "activated" position), the infrared light filter may allow infrared light to pass through the optical system and reach the RGBIR sensor. When the infrared light filter is positioned at the second position (or a "deactivated" position), the infrared light filter may filter out (or block) infrared light from the optical system and, thus, prevent the infrared light from reaching the RGBIR sensor. As the infrared light filter may move between the first position and the second position, it should be appreciated that the infrared light filter may operate as a mechanical shutter. Although the above description provides examples in which the infrared light filter blocks transmission of infrared light through an optical system while allowing visible light to pass through the optical system, it should be appreciated that in other examples, the infrared light filter allows transmission of infrared light through an optical system while blocking visible light from passing through the optical system.

In some examples, the image capture device may select the positioning of the infrared light filter based on a type of application (or example use) causing the generation of the image. For example, when color is beneficial for the image (e.g., when a color-sensitive application causes the generating of an RGB image), the image capture device may position the infrared light filter to filter out the infrared light from the optical system (e.g., position the infrared light filter in the second position (or the deactivated position)). In other examples in which infrared signals may be beneficial for the image (e.g., when a color agnostic application using depth information), the image capture device may position the infrared light filter to allow infrared light to pass through the optical system (e.g., position the infrared light filter in the first position (or the activated position)).

In some examples, it may be beneficial to collect visible light and to collect infrared light. In some such examples, disclosed techniques may perform multiple frame fusion to render RGB images and infrared images. For example, an application using the RGBIR sensor to generate a video or an animation may collect visible light. In some such examples, the image capture device may combine two or more frames of RGB images to generate the video or animation at full resolution. In other examples in which an application is using the RGBIR sensor to perform biometric authentication (e.g., facial recognition, iris recognition, etc.), the image capture device may facilitate collecting infrared light and combine two or more frames of infrared images to perform the biometric authentication.

It should be appreciated that in some examples, when the infrared light filter is positioned to block infrared light from passing through the optical system (e.g., when the infrared light filter is in the deactivated position), the infrared pixels of the RGBIR sensor will not provide RGB data. In some such examples, the image capture device may perform RGB interpolation at the locations of the infrared pixels to generate a full resolution RGB image. Furthermore, it should be appreciated that when the infrared light filter is positioned to allow infrared light to pass through the optical system (e.g., when the infrared light filter is in the deactivated position), the respective pixels of the RGBIR sensor collect respective data (e.g., the imaging pixels of the RGBIR sensor may collect visible light data and the infrared pixels of the RGBIR sensor may collect infrared light data). In some such examples, the image capture device may use the infrared light data collected by the infrared pixels of the RGBIR sensor and then perform upscaling to generate a full resolution infrared image. For example, for the example 4×4 imaging sensor 350 of FIG. 3B, the image capture device may first generate a quarter-size infrared image based on the infrared light data provided by the four infrared pixels 356 and then perform upscaling using the quarter-size infrared image and a full resolution RGB image to generate a full resolution infrared image. For example, the image capture device may align points of the quarter-size infrared image to points of the full resolution RGB image to generate a full resolution infrared image. The image capture device may also use the full resolution RGB image to upscale the full resolution infrared image by, for example, enhancing and/or correcting edges of the full resolution infrared image based on, for example, changes in color of the full resolution RGB image to identify edges and other portions of the full resolution infrared image.

In some examples, the image capture device may include at least two light filters. For example, the image capture device may include an infrared light filter and a visible light filter. In some such examples, both of the filters may be positioned within the optical system of the image capture device and may be movable between respective positions that allow some light to pass through the optical system and that block some light to pass through the optical system. For example, when the infrared light filter is in an activated position (or first position), the infrared light filter may allow infrared light to pass through the optical system and block visible light from passing through the optical system. When the infrared light filter is in a deactivated position (or second position), the infrared light filter may block infrared light from passing through the optical system and allow visible to pass through the optical system. Similarly, when the visible light filter is in an activated position (or third position), the visible light filter may allow visible light to pass through the optical system and block infrared light from passing through the optical system. When the visible light filter is in a deactivated position (or fourth position), the visible light filter may block visible light from passing through the optical system and allow infrared light to pass through the optical system.

In some such examples in which the image capture devices includes at least two light filters (e.g., an infrared light filter and a visible light filter), the image capture device may position the infrared light filter and the visible light filter to generate the respective infrared images and RGB images. For example, when it may be beneficial to capture an RGB image, the image capture device may move the visible light filter into the activated position (e.g., to allow visible light to pass through the optical system) and move the infrared light filter into the deactivated position (e.g., to block infrared light from passing through the optical system). In examples when it may be beneficial to capture an infrared image, the image capture device may move the visible light filter into the deactivated position (e.g., to block visible light from passing through the optical system) and move the infrared light filter into the activated position (e.g., to allow infrared light to pass through the optical system).

It should be appreciated that when the image capture device includes the two light filters (e.g., the visible light filter and the infrared light filter), the imaging sensor may be an RGB sensor (as shown in FIG. 3A) or an RGBIR sensor (as shown in FIG. 3B). For example, the imaging pixels of the RGB sensor may collect infrared light. In some such examples, the image capture device may generate full resolution RGB images and full resolution infrared images. As used herein, a full resolution image is an image that uses information collected from all of the pixels of the imaging sensor to generate the image. For example, for a 4×4 RGB sensor, the image capture device may generate a full resolution RGB image when the sixteen pixels of the RGB sensor generate visible light data and the generated visible light data is used to generate the RGB image. Similarly, the image capture device may generate a full resolution infrared image when the sixteen pixels of the RGB sensor generate infrared light data and the generated infrared light data is used to generate the infrared image.

Figure 6:
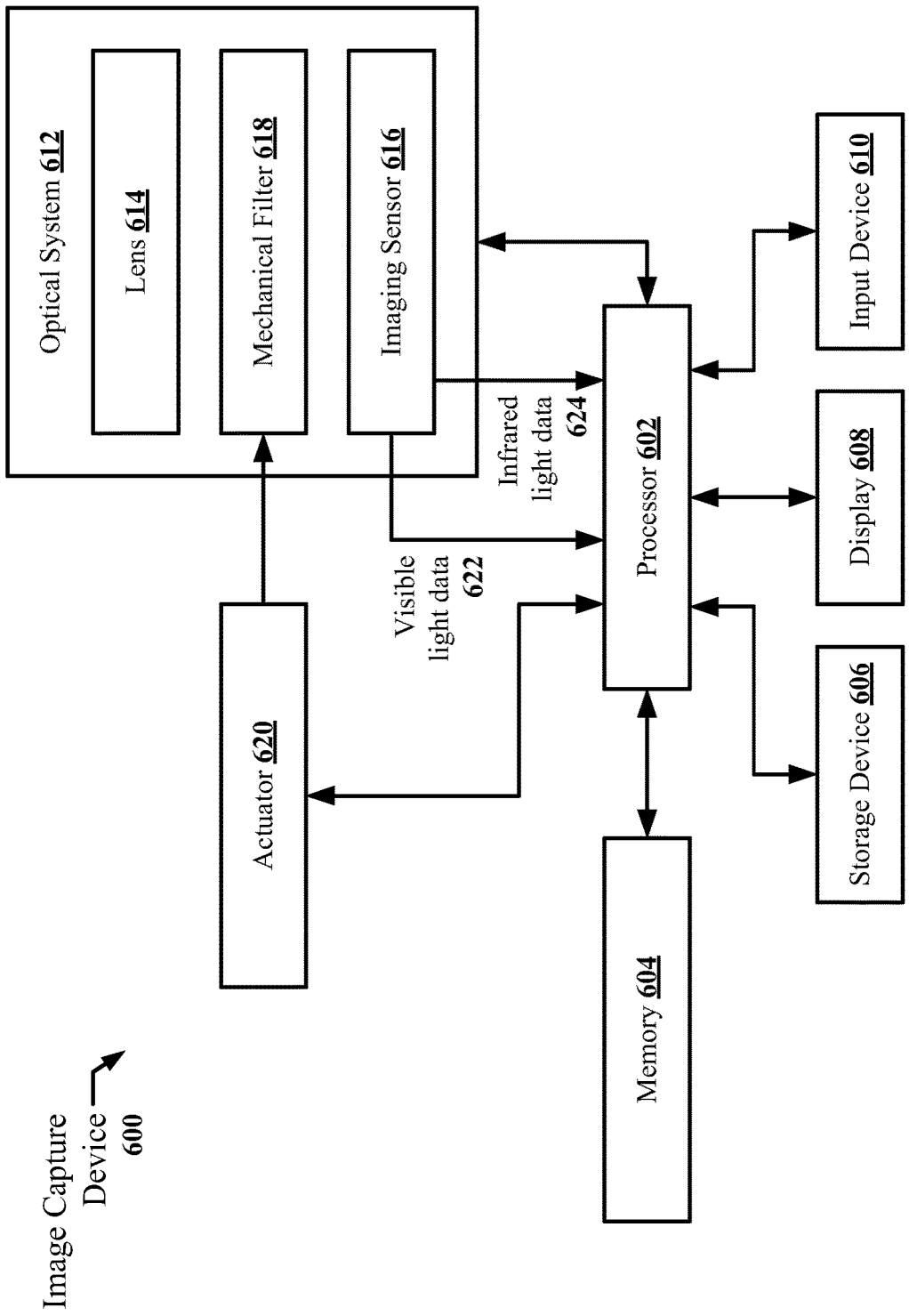
FIG. 6 is a block diagram of an example image capture device, in accordance with certain aspects of this disclosure.

FIG. 6 is a block diagram of an example image capture device 600. The example image capture device 600 includes at least one processor 602 to facilitate capturing images. In the illustrated example of FIG. 6, the processor 602 is in communication with a memory 604, a storage device 606, a display 608, an input device 610, an optical system 612, and an actuator 620.

Although the example image capture device 600 of FIG. 6 illustrates separate components to implement the processor 602, the memory 604, and the storage device 606, it should be appreciated that in other examples, one or more of the processor 602, the memory 604, and/or the storage device 606 may be combined in a variety of ways. For example, the memory 604 and/or the storage device 606 may be combined with the processor 602 in a system on a chip (SOC).

The image capture device 600 may be a special-purpose camera or a multi-purpose device capable of performing imaging and non-imaging applications. For example, the image capture device 600 may be a portable personal computing device, such as a cellular phone, a smart phone, a laptop, a personal digital assistant (PDA), a multimedia device, a video device, a camera, a game console, a tablet, a smart device, a wearable device, a vehicle, an autonomous vehicle, a healthcare device, a robot, etc. In some examples, the image capture device 600 may include an operating system that acts as an intermediary between programs and the processor 602. In some examples, the operating system may include device drivers to manage hardware resources such as the image capture device 600.

It should be appreciated that the image capture device 600 may include one or more additional optical components mounted inside a housing of the image capture device 600 and/or positioned on the housing or the optical system 612. For example, the additional optical components may include a motion sensor (e.g., an accelerometer, a gyroscope, etc.), apertures, shutters, mirrors, filters, coatings, etc.

The processor 602 may include multiple processors, such as a general purpose processor and/or an image signal processor (ISP). In some examples, the processor 602 may include a single central processing unit that performs image signal processing, multiple frame fusion, and other operations. The processor 602 may include one or more dedicated processors or a software implementation programmed on a general purpose processor. In some examples, the processor 602 may be implemented in application specific integrated circuits (ASIC) or in a programmable gate array (PGA).

In some examples, the processor 602 facilitates controlling image capture functions, such as autofocus, auto-white balance, and/or auto-exposure. In some examples, the processor 602 may also facilitate performing post-processing functions, such as depth mapping and/or Bokeh effect. In some examples, the processor 602 may also facilitate performing cropping, scaling (e.g., to a different resolution), image stitching, image format conversion, color interpolation, color processing, image filtering (e.g., spatial image filtering), lens artifact or defect correction, sharpening, or the like.

In the illustrated example of FIG. 6, the processor 602 is in communication with the memory 604, which may include an instruction memory for storing instructions and a working memory. The example memory 604 may include a variety of components that configure the processor 602 to perform various image processing and device management tasks. In some examples, the memory 604 may include specialized memory components for particular types of operations or data. For example, the memory 604 may include an instruction memory comprising flash memory, and a working memory comprising dynamic random access memory (DRAM).

The example processor 602 may write data to the storage device 606. The data may include data representing captured images, data generated during fusion, and/or metadata (e.g., exchangeable image file format (EXIF) data). The example storage device 606 may be configured as any type of computer-readable medium. For example, the storage device 606 can include a disk drive, such as a hard disk drive (HDD), an optical disk drive or magneto-optical disk drive, or a solid state memory such as FLASH memory, random access memory (RAM), read-only memory (ROM), and/or electrically-erasable programmable ROM (EEPROM). The example storage device 606 may additionally or alternatively include multiple memory units.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

In the illustrated example of FIG. 6, the processor 602 may be configured to control the display 608 to display the captured image or a preview of the captured image to a user. The example display 608 may be external to the image capture device 600 or can be part of the image capture device 600. In some examples, the display 608 may be configured to provide a view finder displaying a preview image prior to capturing an image. The example display 608 may include a liquid crystal display (LCD), light emitting diode (LED), or organic light emitting diode (OLED) screen, and can be touch sensitive and serve as an input device. In some examples, the image capture device 600 may additionally or alternatively include inputs 610, such as buttons, joy sticks, or the like.

In the illustrated example of FIG. 6, the processor 602 is in communication with the optical system 612. The example optical system 612 of FIG. 6 includes a lens 614, an imaging sensor 616, and a mechanical filter 618. The lens 614 may facilitate focusing incoming light onto the pixels of the imaging sensor 616. It should be appreciated that the lens 614 may include any number of optical elements.

The example imaging sensor 616 may be a complementary metal oxide semiconductor (CMOS) imaging sensor or a charge-coupled device (CCD) sensor. The example imaging sensor 616 of FIG. 6 includes a plurality of imaging pixels for capturing visible light data. In some examples, the imaging sensor 616 may include imaging pixels 354 and infrared pixels 356, such as the example imaging sensor 350 of FIG. 3B. In some examples, the imaging sensor 616 may include imaging pixels 304, such as the example imaging sensor 300 of FIG. 3A. The example imaging sensor 616 of FIG. 6 may generate visible light data 622 based on visible light collected by the imaging sensor 616. The example imaging sensor 616 may additionally or alternatively generate infrared light data 624 based on infrared light collected by the imaging sensor 616.

In the illustrated example of FIG. 6, the optical system 612 includes the mechanical filter 618 configured to move between a first position (e.g., an activated position) and a second position (e.g., a deactivated position). As shown in FIG. 6, the processor 602 is in communication with the actuator 620, which can adjust the position of the mechanical filter 618. The actuator 620 may be a switch, a motor, etc. that can be controlled by the processor 602 and facilitate the movement of the mechanical filter 618.

Figure 7A:
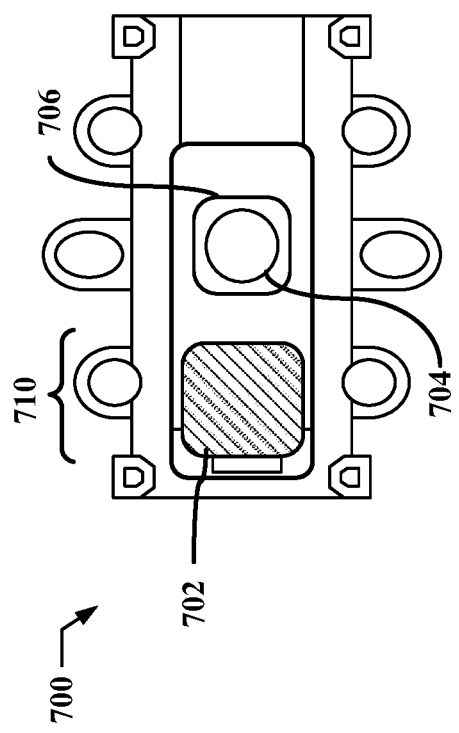
FIG. 7A illustrates a front view of an optical system including a mechanical filter in a first position, in accordance with certain aspects of this disclosure.
Figure 7B:
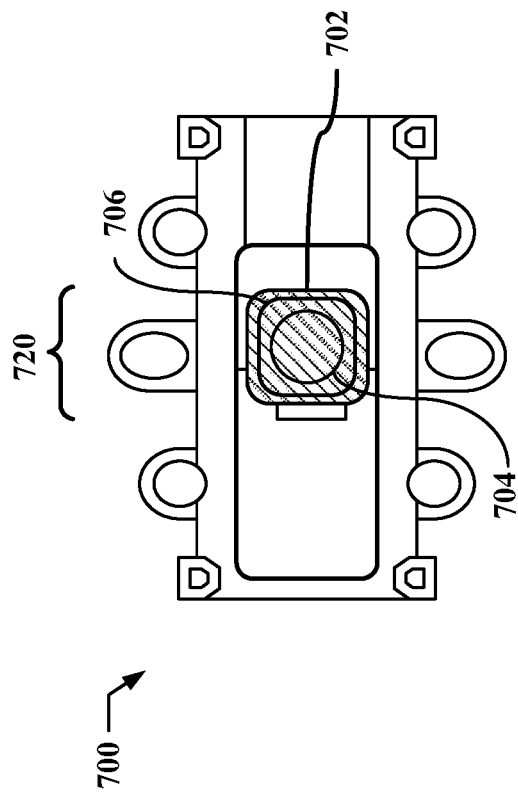
FIG. 7B illustrates a front view of the optical system of FIG. 7A including the mechanical filter in a second position, in accordance with certain aspects of this disclosure.

In some examples, the mechanical filter 618 includes an infrared light filter that is movable between a first position (e.g., an activated position) and a second position (e.g., a deactivated position). For example, FIG. 7A illustrates a front view of an optical system 700 including a mechanical filter 702 in an activated position 710 (or the first position to allow infrared light to pass through the optical system 700). FIG. 7B illustrates a front view of the optical system 700 including the mechanical filter 702 in a deactivated position 720 (or the second position to block infrared light from passing through the optical system 700). It should be appreciated that aspects of the optical system 700 may be implemented by the optical system 612 of FIG. 6. The example optical system 700 also includes a lens 704 and an imaging sensor 706. In the illustrated example, the mechanical filter 702 is positioned between the lens 704 and the imaging sensor 706.

In the illustrated example of FIGS. 7A and 7B, the mechanical filter 702 includes a mechanical infrared light filter that is movable between the first position 710 and the second position 720. The infrared light filter may be glass (or other material, such as a dye) that is configured to block the transmission of infrared light through the optical system 700 and to allow visible light to pass through the optical system 700. For example, when the infrared light filter 702 is positioned in front of the imaging sensor 706 (e.g., via the actuator 620 of FIG. 6) in the second position 720 (as shown in FIG. 7B), the infrared light filter 702 may be configured to filter out (or block) infrared light from reaching the imaging sensor 706 and to allow visible light to reach the imaging sensor 706. Thus, the imaging pixels of the imaging sensor 706 (e.g., the example imaging pixels 354 of FIG. 3B) may collect visible light and generate visible light data. When the infrared light filter 702 is positioned (e.g., via the actuator 620) in the first position 710 (as shown in FIG. 7A), the infrared light filter 702 does not filter out infrared light from reaching the imaging sensor 706 (e.g., infrared light is allowed to reach the imaging sensor 706). Thus, the imaging pixels of the imaging sensor 706 (e.g., the example imaging pixels 354) may collect visible light and generate visible light data, and the infrared pixels of the imaging sensor 706 (e.g., the example infrared pixels 356 of FIG. 3B) may collect infrared light and generate infrared light data.

Figure 8:
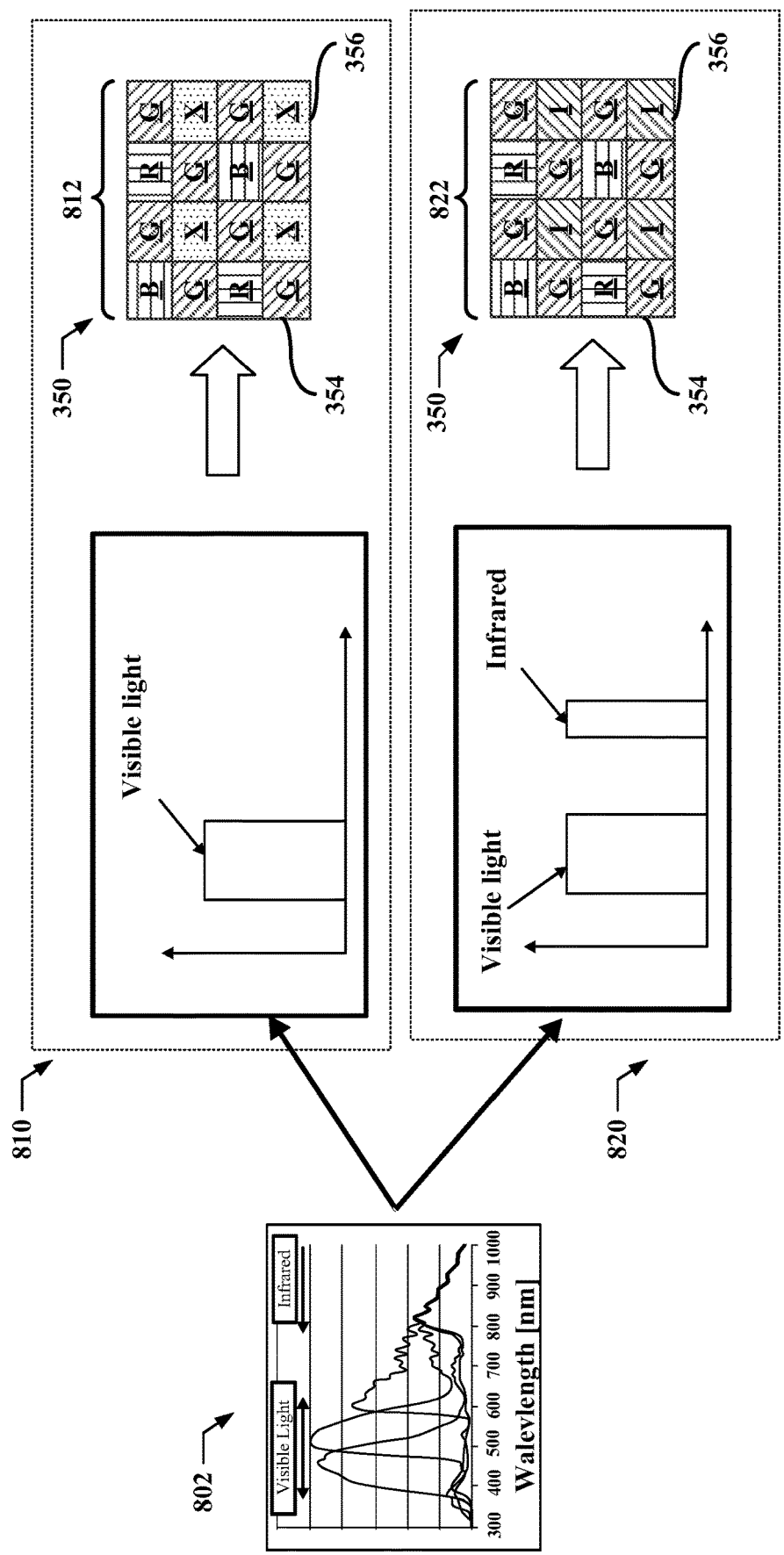
FIG. 8 illustrates an example in which light, including at least visible light and infrared light, is received at an optical system, in accordance with certain aspects of this disclosure.

For example, FIG. 8 illustrates an example in which light 802, including at least visible light and infrared light, is received at an optical system, such as the example optical system 700 of FIGS. 7A and 7B.

In the illustrated example of FIG. 8, a first sequence 810 illustrates the generation of first light data 812 for generating an RGB image by an imaging sensor, such as the example RGBIR sensor 350 of FIG. 3B. In the illustrated example of FIG. 8, the first sequence 810 corresponds to the mechanical filter 702 being positioned in the second position 720 (as shown in FIG. 7B). For example, the infrared light filter 702 may be positioned to block infrared light from reaching the RGBIR sensor 350 and to allow visible light to pass through the optical system and reach the RGBIR sensor 350. As shown in FIG. 8, the first light data 812 is generated by the imaging pixels 354 of the RGBIR sensor 350 and, thus, the first light data 812 includes visible light data. In the illustrated example, the infrared pixels 356 of the RGBIR sensor 350 may not generate infrared light data and, thus, the first light data 812 may not include infrared light data. It should be appreciated that in some examples, the infrared pixels 356 may provide some light data (e.g., visible light data or infrared light date) that is discarded during processing by, for example, the processor 602 of FIG. 6.

In the illustrated example of FIG. 8, a second sequence 820 illustrates the generation of second light data 822 for generating an infrared image by the example RGBIR sensor 350 of FIG. 3B. In the illustrated example of FIG. 8, the second sequence 820 corresponds to the mechanical filter 702 being positioned in the first position 710 (as shown in FIG. 7A). For example, the positioning of the mechanical filter 702 may allow visible light and infrared light to reach the RGBIR sensor 350. As shown in FIG. 8, the imaging pixels 354 of the RGBIR sensor 350 may generate visible light data of the second light data 822 and the infrared pixels 356 of the RGBIR sensor 350 may generate infrared light data of the second light data 822.

As shown in FIG. 8, the first light data 812 generated via the first sequence 810 (e.g., when the mechanical filter 702 is in the second position) includes pixels that may not provide visible light data. For example, the infrared pixels 356 may not generate visible light data or may provide visible light data that is discarded. Thus, it should be appreciated that the first light data 812 may not facilitate generating a full resolution RGB image. Furthermore, the second light data 822 generated via the second sequence 820 (e.g., when the mechanical filter 702 is in the first position) includes pixels that provide visible light data and infrared light data. For example, the imaging pixels 354 may generate visible light data and the infrared pixels 356 may generate infrared light data. However, it should be appreciated that the second light data 822 may not facilitate generating a full resolution infrared image.

Figure 9:
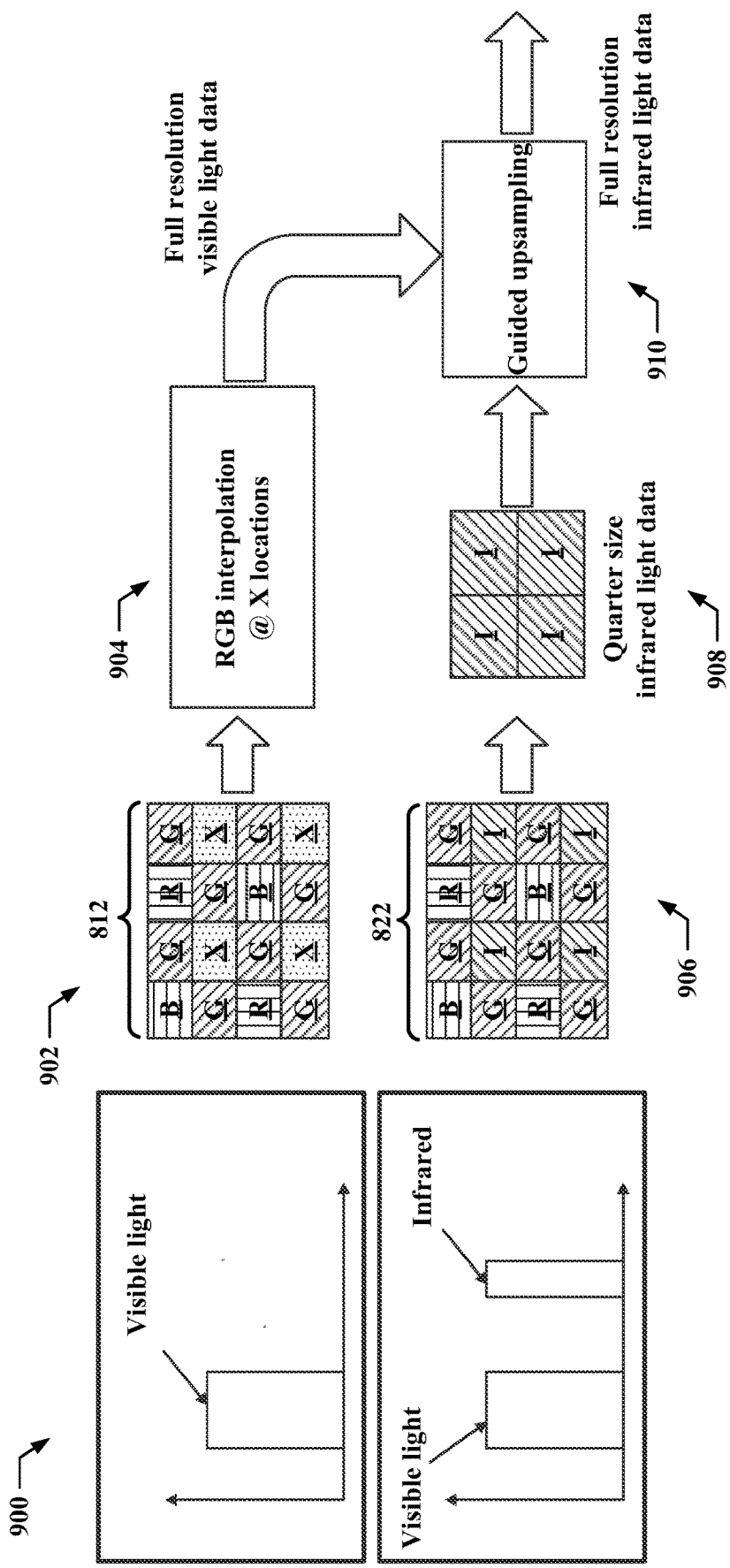
FIG. 9 illustrates an example flowchart of an example method for generating full resolution RGB images and for generating full resolution infrared images based on first light data and second light data, in accordance with certain aspects of this disclosure.

FIG. 9 illustrates an example flowchart 900 of an example method for generating full resolution RGB images and for generating full resolution infrared images based on the first light data 812 and the second light data 822 of FIG. 8. The method may be performed by an apparatus, such as the example image capture device 600 of FIG. 6, and/or a component of the apparatus, such as the example processor 602 of FIG. 6.

At 902, the apparatus may receive the first light data 812. For example, the apparatus may receive the first light data 812 when the mechanical filter 702 is positioned in the second position 720 (e.g., the deactivated position) to filter out (or block) infrared light from reaching the imaging sensor 706 of FIG. 7.

At 904, the apparatus may perform RGB interpolation using the first light data 812 to determine visible light data for the pixels that did not provide visible light data (e.g., the infrared pixels 356 of the RGBIR sensor 350). For example, the apparatus may use the visible light data provided by the imaging pixels 354 adjacent to the infrared pixels 356 to compute visible light data for the infrared pixels 356. The apparatus may combine the visible light data provided by the imaging pixels 354 and the computed visible light data for the infrared pixels 356 to generate full resolution visible light data for generating a full resolution RGB image.

At 906, the apparatus may receive the second light data 822. For example, the apparatus may receive the second light data 822 when the mechanical filter 702 is positioned in the first position 710 (e.g., the activated position) to allow visible light and infrared light to reach the imaging sensor 706 of FIG. 7.

At 908, the apparatus may use the infrared light data of the second light data 822 to generate low resolution infrared light data. For example, the apparatus may use the infrared light data provided by the infrared pixels 356 and discard the visible light data provided by the imaging pixels 354 of the RGBIR sensor 350. In the illustrated example of FIG. 9, the infrared light data is provided by four infrared pixels 356 of the sixteen pixels 354, 356 and, thus, the low resolution infrared light data corresponds to quarter-size infrared light data.

At 910, the apparatus may perform guided upsampling (or upscaling) of the low resolution infrared light data to generate full resolution infrared light data. For example, the apparatus may use the full resolution visible light data to perform the guided upsampling and to generate the full resolution infrared light data. In some examples, the apparatus may perform the guided upsampling by comparing points of the full resolution visible light data and the low resolution infrared light data and aligning points of the full resolution visible light data with corresponding portions of the low resolution infrared light data. Accordingly, full resolution infrared light data may be created based on the full resolution visible light data and the low resolution infrared light data. Furthermore, the apparatus may upsample the full resolution infrared light data by, for example, using the full resolution visible light data to enhance and/or correct edges of the full resolution infrared light data. For example, colors of the full resolution visible light data may be used to determine an edge of a portion of the full resolution infrared light data and the beginning of other portions. Example techniques for performing guided upsampling include guided bilateral techniques and guide filter techniques.

It should be appreciated that the apparatus may use the full resolution visible light data to render a full resolution RGB image, and that the apparatus may use the full resolution infrared light data to render a full resolution infrared image.

Figure 10B:
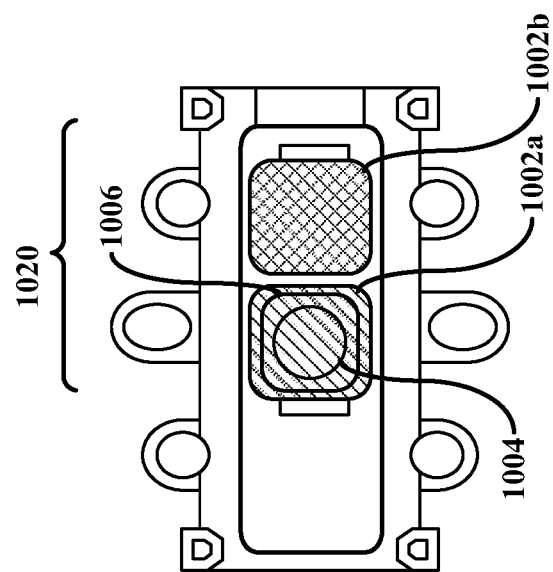
FIG. 10B illustrates a front view of the optical system of FIG. 10A including the mechanical filter in a second position, in accordance with certain aspects of this disclosure.
Figure 10A:
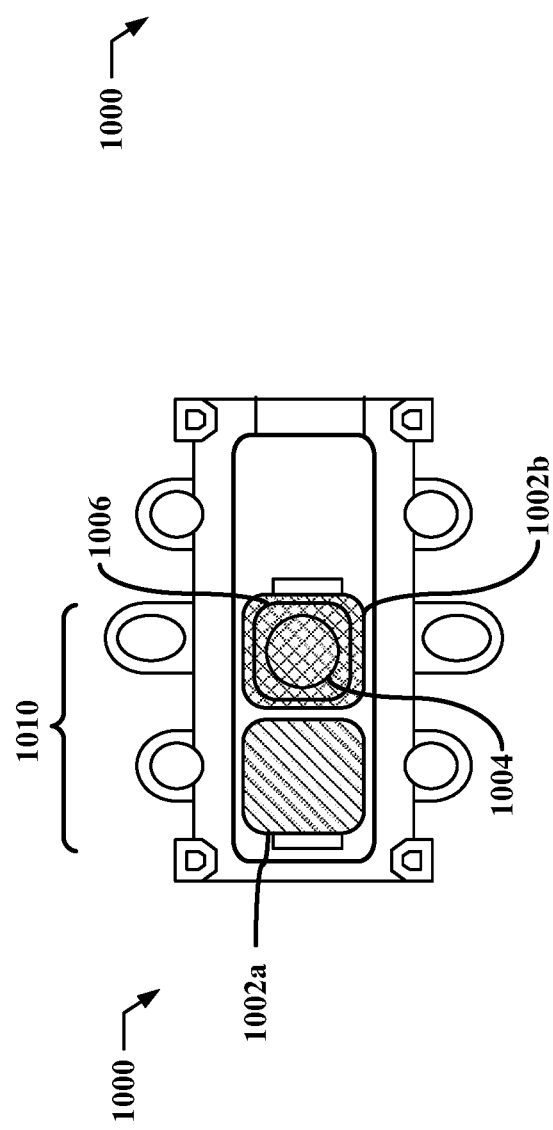
FIG. 10A illustrates a mechanical filter, including an infrared light filter and a visible light filter, in a first position, in accordance with certain aspects of this disclosure.

Returning to the image capture device 600 of FIG. 6, in some examples, the mechanical filter 618 may include an infrared light filter that is movable between a first position and a second position and a visible light filter that is movable between a third position and a fourth position. For example, FIG. 10A illustrates a mechanical filter 1002, including an infrared light filter 1002a and a visible light filter 1002b, in a first position 1010. FIG. 10B illustrates the optical system 1000 including the mechanical filter 1002 in a second position 1020. It should be appreciated that aspects of the optical system 1000 may be implemented by the optical system 612 of FIG. 6. The example optical system 1000 may also include a lens 1004 and an imaging sensor 1006. In the illustrated example, the mechanical filter 1002 is positioned between the lens 1004 and the imaging sensor 1006.

In the illustrated examples of FIGS. 10A and 10B, when the mechanical filter 1002 is in the first position 1010 (as shown in FIG. 10A), the infrared light filter 1002a is in an activated position (or a first position) to allow infrared light to pass through to the imaging sensor 1006 and the visible light filter 1002b is in a deactivated position (or a fourth position) to block visible light from passing through to the imaging sensor 1006. When the mechanical filter 1002 is in the second position 1020 (as shown in FIG. 10B), the infrared light filter 1002a is in a deactivated position (or a second position) to block infrared light from passing through to the imaging sensor 1006 and the visible light filter 1002b is in an activated position (or a third position) to allow visible light to pass through to the imaging sensor 1006. By allowing light at visible wavelengths to reach the imaging sensor 1006, the color filters associated with the respective imaging pixels of the imaging sensor 1006 may then generate RGB information.

In the illustrated example of FIGS. 10A and 10B, the mechanical filter 1002 includes the infrared light filter 1002a and the visible light filter 1002b that are each movable between respective activated and deactivated positions. The infrared light filter 1002a may be glass that is configured to block the transmission of infrared light through the optical system 1000 and to allow visible light to pass through the optical system 1000 (e.g., the infrared light filter 1002a may be configured to block light at infrared wavelengths and to allow light at visible wavelengths). The visible light filter 1002b may be glass that is configured to block the transmission of visible light through the optical system 1000 and to allow infrared light to pass through the optical system 1000 (e.g., the visible light filter 1002b may be configured to block light at visible wavelengths and to allow light at infrared wavelengths). However, it should be appreciated that any other suitable material, such as a dye, a gel, etc., may be used for the filters 1002 that is configured to allow some portions of light to pass and to block other portions of light.

In the illustrated examples of FIGS. 10A and 10B, the mechanical filter 1002 is configured so that at least one of the infrared light filter 1002a or the visible light filter 1002b is positioned in front of the imaging sensor 1006 (e.g., is in the deactivated position to block a portion of light). It should be appreciated that when a filter is positioned in front of the imaging sensor 1006, the respective filter may be referred to as being in the "on position," and when a filter is not positioned in front of the imaging sensor 1006, the respective filter may be referred to as being in the "off position." It should be appreciated that other examples may use additional or alternative techniques for arranging the filters 1002a, 1002b of the mechanical filter 1002 when in the on position and when in the off position.

For example, in FIG. 10A, the visible light filter 1002b is positioned in front of the imaging sensor 1006 (e.g., in the deactivated position or the fourth position) and the infrared light filter 1002a is positioned to the side of the imaging sensor 1006 (e.g., in the activated position or the first position). That is, in the example of FIG. 10A, the visible light filter 1002b is in the "on position" and the infrared light filter 1002a is in the "off position". In FIG. 10B, the infrared light filter 1002a is positioned in front of the imaging sensor 1006 (e.g., in the activated position or the second position) and the visible light filter 1002a is positioned to the side of the imaging sensor 1006 (e.g., in the deactivated position or the third position). That is, in the example of FIG. 10B, the infrared light filter 1002a is in the "on position" and the visible light filter 1002b is in the "off position".

As mentioned above, in some examples, the imaging pixels of an imaging sensor may capture visible light and may also capture infrared light. For example, while the RGB sensor 300 of FIG. 3A includes the imaging pixels 304 configured to capture visible light, the imaging pixels 304 may also be configured to capture infrared light. For example, if a light filter blocks visible light from reaching the pixels of the imaging sensor (and allows infrared light to reach the pixels of the imaging sensor), the respective pixels may be unable to generate RGB data, but may be able to generate infrared data. Thus, when the infrared light filter 1002a is in the on position (as shown in FIG. 10B), the infrared light filter 1002a is positioned to block infrared light from reaching the imaging sensor 1006 and to allow visible light to reach the imaging sensor 1006. Accordingly, the pixels of the imaging sensor 1006 may be configured to capture visible light and generate visible light data. Furthermore, when the visible light filter 1002b is in the on position (as shown in FIG. 10A), the visible light filter 1002b is positioned to block visible light from reaching the imaging sensor 1006 and to allow infrared light to reach the imaging sensor 1006. Accordingly, the imaging pixels of the imaging sensor 1006 may be configured to capture infrared light and generate infrared light data. Although the above description provides an example in which the imaging sensor is the RGB sensor 300 of FIG. 3A, it should be appreciated that in other examples, the imaging sensor may be the RGBIR sensor 350 of FIG. 3B.

Figure 11:
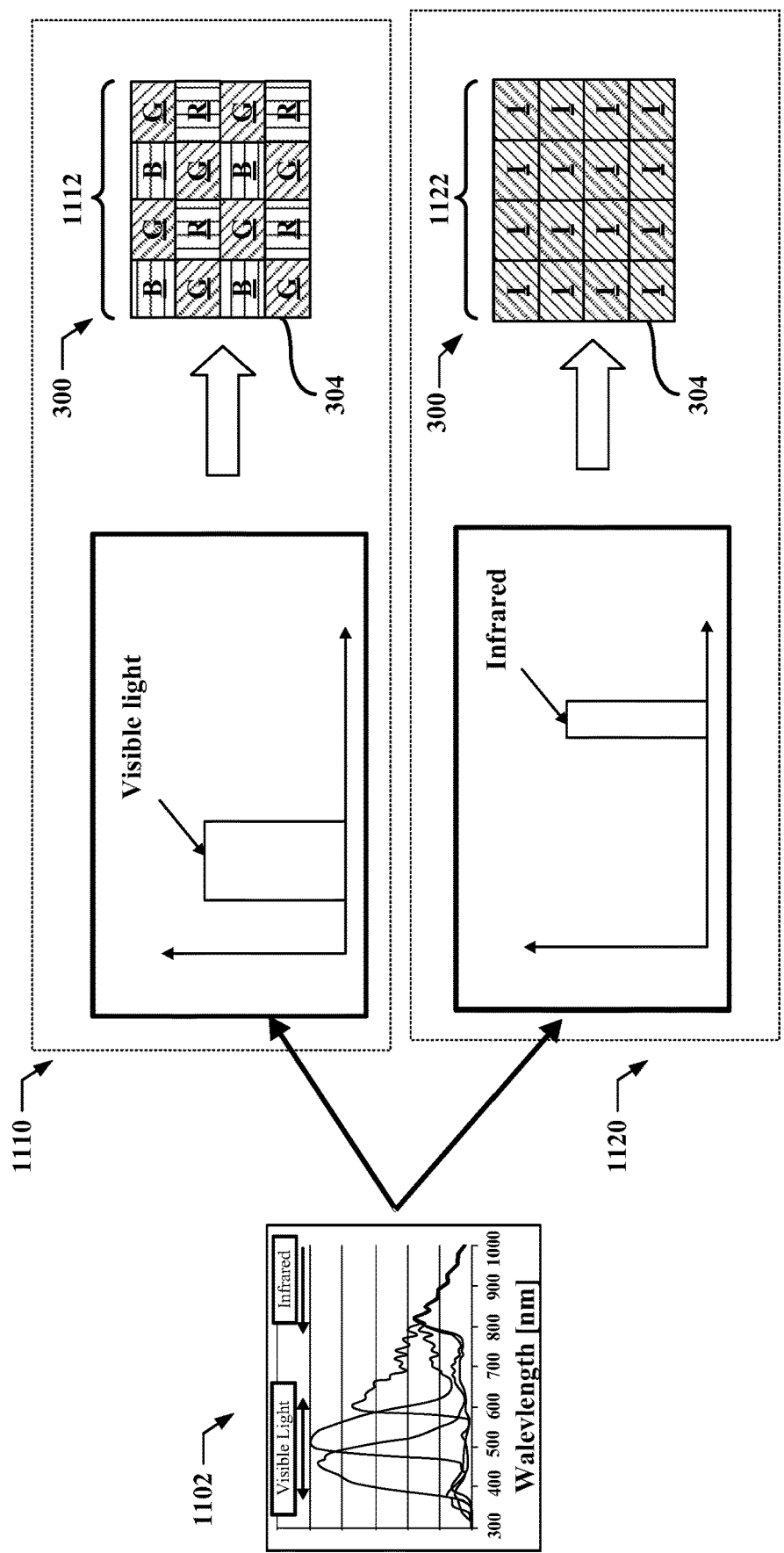
FIG. 11 illustrates an example in which light, including at least visible light and infrared light, is received at an optical system, in accordance with certain aspects of this disclosure.

For example, FIG. 11 illustrates an example in which light 1102, including at least visible light and infrared light, is received at an optical system, such as the example optical system 1000 of FIGS. 10A and 10B. Although the following description may be focused on an optical system 1000 including an RGB sensor, it should be appreciated that in other examples, the concepts described herein may be applicable to an optical system including an RGBIR sensor.

In the illustrated example of FIG. 11, a first sequence 1110 illustrates generation of first light data 1112 for generating an RGB image by an imaging sensor, such as the example RGB sensor 300 of FIG. 3A. In the illustrated example of FIG. 11, the first sequence 1110 corresponds to the mechanical filter 1002 being positioned in the second position 1020 (as shown in FIG. 10B). For example, the infrared light filter 1002a may be in the on position (e.g., the deactivated position) and be configured to block infrared light from reaching the RGB sensor 300 and to allow visible light to pass through the optical system and reach the RGB sensor 300. In some such examples, the visible light filter 1002b may be in the off position (e.g., the activated position) and, thus, may not impact the light (e.g., visible light and/or infrared light) from reaching the RGB sensor 300.

As shown in FIG. 11, the first light data 1112 is generated by the imaging pixels 304 of the RGB sensor 300 and, thus, the first light data 1112 includes visible light data. It should be appreciated that in the illustrated example, the RGB sensor 300 may generate full resolution visible light data that may be used, for example, by the processor 602 of FIG. 6 to render a full resolution RGB image.

In the illustrated example of FIG. 11, a second sequence 1120 illustrates generation of second light data 1122 for generating an infrared image by the example RGB sensor 300 of FIG. 3A. In the illustrated example of FIG. 11, the second sequence 1120 corresponds to the mechanical filter 1002 being positioned in the first position 1010 (as shown in FIG. 10A). For example, the visible light filter 1002b may be in the on position (e.g., the deactivated position) and be configured to block visible light from reaching the RGB sensor 300 and to allow infrared light to pass through the optical system and reach the RGB sensor 300. In some such examples, the infrared light filter 1002a may be in the off position (e.g., in the activated position) and, thus, may not impact the light (e.g., visible light and/or infrared light) from reaching the RGB sensor 300.

As shown in FIG. 11, the second light data 1122 is generated by the imaging pixels 304 of the RGB sensor 300, which are capable of capturing infrared light. As described above, in some examples, imaging pixels may be capable of generating infrared information. For example, when light from visible light wavelengths are blocked from reaching the RGB sensor, the imaging pixels may convert the light of the non-visible light wavelengths received at the imaging pixels into information that corresponds to infrared information. Accordingly, the second light data 1112 includes infrared light data captured by the imaging pixels 304. It should be appreciated that in the illustrated example, the RGB sensor 300 may generate full resolution infrared light data that may be used, for example, by the processor 602 of FIG. 6 to render a full resolution infrared image.

As shown in the illustrated examples, it may be beneficial to include an infrared light filter and a visible light filter in the mechanical filter. For example, by including the infrared light filter and the visible light filter, respective full resolution images may be rendered without the performing of interpolation and/or upsampling, as disclosed above in connection with FIGS. 7 to 9. However, it should be appreciated that including the infrared light filter and the visible light may incur additional or alternative costs, such as the cost of including two filters, the cost of including two movable filters, the processing resources for determining which position to move the respective filter, etc.

Returning to the image capture device 600 of FIG. 6, in some examples, the processor 602 may be configured to perform fusion to combine visible light data with the infrared light data. For example, for applications that may use depth information when rendering an image, such as when performing 3D rendering, providing a Bokeh effect, etc., the processor 602 may combine visible light data from one or more frames with infrared light data from one or more frames to generate, for example, an RGB image with depth information.

Figure 12:
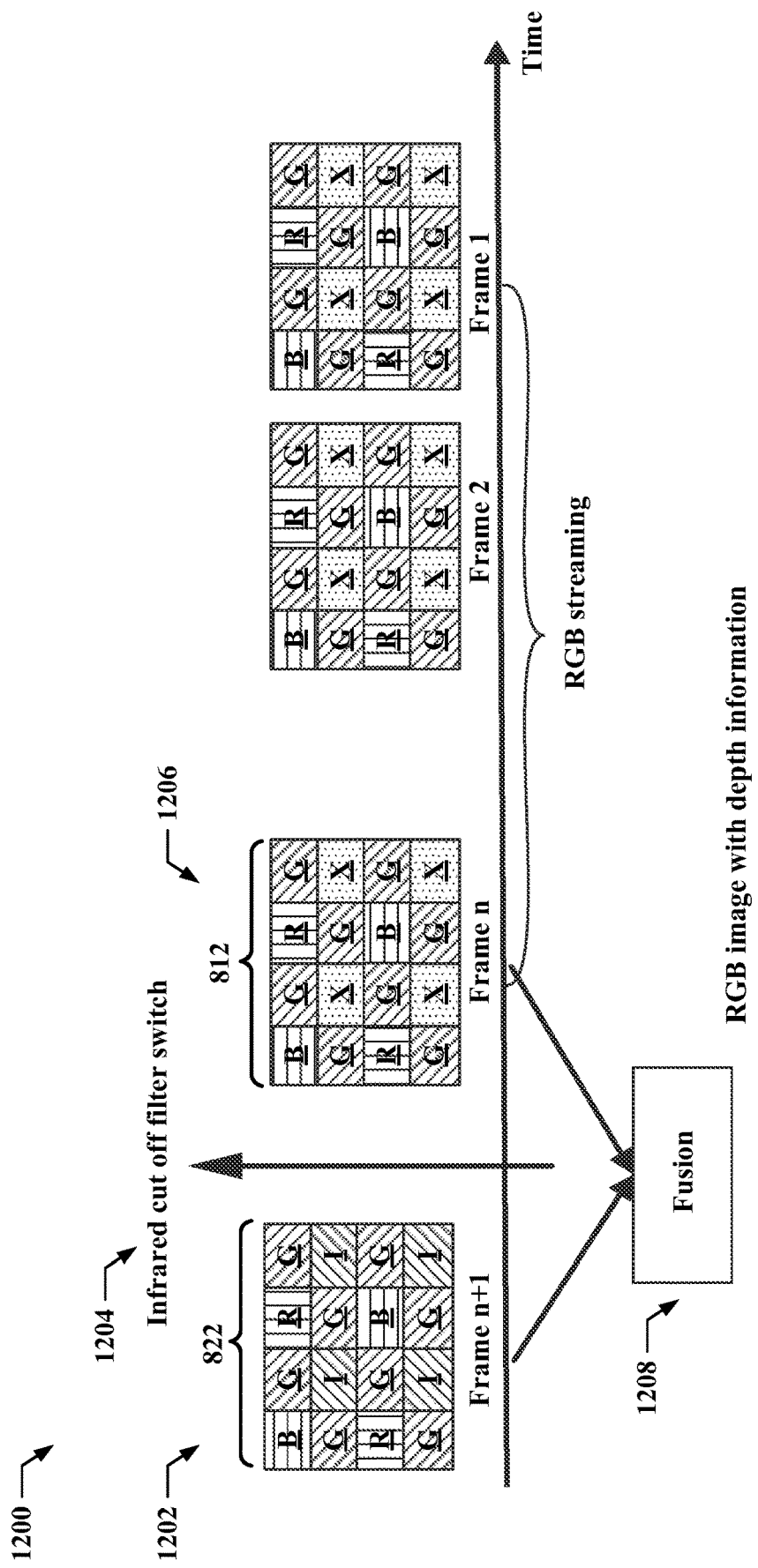
FIG. 12 illustrates an example timeline of an example method for generating an RGB image with depth information, in accordance with certain aspects of this disclosure.

FIG. 12 illustrates an example timeline 1200 of an example method for generating an RGB image with depth information. The method may be performed by an apparatus, such as the example image capture device 600 of FIG. 6, and/or a component of the apparatus, such as the example processor 602 of FIG. 6. In the illustrated example of FIG. 12, the apparatus includes a single filter (e.g., an infrared light filter), such as the example optical system 700 of FIG. 7 including the infrared light filter 702. However, it should be appreciated that the following concepts may be applied to an apparatus including two filters (e.g., an infrared light filter and a visible light filter), such as the example optical system 1000 of FIG. 10.

At 1202, the apparatus may collect light data with the infrared light filter in the off position (e.g., in the activated position, as shown in FIG. 7A). For example, the apparatus may receive the second light data 822 including visible light data and infrared light data (e.g., an RGBIR frame).

At 1204, the apparatus may trigger an infrared cut-off filter switch. For example, the apparatus may cause the infrared light filter to move from the off position (e.g., the activated position 710 of FIG. 7A) to the on position (e.g., the deactivated position 720 of FIG. 7B).

At 1206, the apparatus may collect light data with the infrared light filter in the on position (e.g., in the deactivated position, as shown in FIG. 7B). For example, the apparatus may receive the first light data 812 including visible light data and no or relatively less infrared light data than with the infrared light filter in the off position (or infrared light data that can be discarded) (e.g., an RGB frame).

At 1208, the apparatus may perform fusion of the light data using the second light data 822 and the first light data 812 to render an RGB image including depth information. For example, the apparatus may combine the visible light data of the first light data 812 with the infrared light data of the second light data 822 to render the RGB image including depth information. In some examples, to render the RGB image including depth information, the apparatus may align the geometries of the first light data 812 and the second light data 822. For example, the apparatus may align points of the first light data 812 with corresponding points of the second light data 822. Accordingly, the apparatus may use the infrared light data of the second light data 822 to provide depth information to the RGB image corresponding to the visible light data of the first light data 812.

In some examples, prior to performing the fusion, the apparatus may process the light data 812, 822 to generate the full resolution light data. For example, as described above in connection with FIG. 9, the apparatus may perform interpolation to generate full resolution visible light data and may perform guided upsampling to generate full resolution infrared light data.

In some examples, the apparatus may combine visible light data from two or more frames prior to performing the fusion. For example, the apparatus may be operating in an RGB streaming mode in which the infrared light filter is in the on position for a series of consecutive RGB frames (e.g., frame n to frame 1 in the illustrated example of FIG. 12). In some such examples, the apparatus may capture visible light data for the series of consecutive RGB frames and then combine two or more RGB frames into a combined RGB frame. In some examples, the apparatus may selectively combine two or more of the RGB frames. For example, the apparatus may select a base frame from the series of consecutive RGB frames based on an image quality metric, such as sharpness or contrast, align the visible light data from one or more other RGB frames of the series of consecutive RGB frames with the base frame, and then combine the two or more RGB frames (e.g., the base frame and the one or more other RGB frames) to generate a combined RGB frame with a greater level of detail.

Returning to the image capture device 600 of FIG. 6, in some examples, the processor 602 may be configured to select the position of the mechanical filter 618 and/or a duration (e.g., a duration of time) of maintaining the position of the mechanical filter 618. In some examples, the processor 602 may select the position of the mechanical filter 618 based on a type of application causing the image capture device 600 to generate (or render) an image (e.g., in response to an image capture trigger). It should be appreciated that the image capture trigger may be received via an application during run-time or may be indirectly received via a user interface. Furthermore, in some examples, the position of the mechanical filter 618 may be requested by a user (e.g., may be requested via a user interface). For example, a user may request the mechanical filter 618 be in a position by selecting the position using a user interface.

In some examples, the type of application causing the image capture device 600 to generate the image may be a color-sensitive application (e.g., a color-sensitive application-type application). For example, when generating an RGB image or an RGB video, good color reproduction may be beneficial. In some such examples, the processor 602 may cause the actuator 620 to position the mechanical filter 618 so that an infrared light filter is positioned in the on position. In some such examples, the image capture device 600 may collect a series of consecutive RGB frames (e.g., one or more RGB frames) of visible light data with the infrared light filter positioned to block infrared light from passing through the optical system 612 to the imaging sensor 616. The example processor 602 may then process the collected visible light data to generate full resolution visible light data to render full resolution RGB images.

In some examples, the type of application causing the image capture device 600 to generate the image may be a color agnostic application (e.g. a color agnostic application-type application). For example, when generating an image in low-light environments in which color reproduction may not be beneficial, the processor 602 may cause the actuator 620 to position the mechanical filter 618 so that an infrared light filter is positioned in the off position. In some such examples, the image capture device 600 may collect one or more frames of light data, including visible light data and/or infrared light data, and then process the collected light data to generate full resolution infrared light data for rendering full resolution infrared images.

It should be appreciated that in examples in which the mechanical filter 618 includes an infrared light filter and a visible light filter (as shown in FIGS. 10A and 10B), the collected light data may be used to generate the full resolution visible light data and/or the full resolution infrared light data without performing interpolation and/or guided upsampling.

In some examples, the processor 602 may cause the actuator 620 to position the mechanical filter 618 to collect two or more frames of visible light data in response to an image capture trigger. For example, when generating an animation or a video, the processor 602 may cause the mechanical filter 618 to be in the second position (e.g., the deactivated position) to block infrared light from passing through the optical system 612 and to allow visible light to pass through the optical system 612 (as shown in FIGS. 7B and 10B).

In some examples, the processor 602 may cause the actuator 620 to position the mechanical filter 618 to collect two or more frames of infrared light data in response to an image capture trigger. For example, when generating an animation or a video in low-light environments, the processor 602 may cause the mechanical filter 618 to be in the first position (e.g., the activated position) to allow infrared light to pass through the optical system 612 (as shown in FIG. 7A) or to allow infrared light to pass through the optical system 612 and to block visible light from passing through the optical system 612 (as shown in FIG. 10A).

In some examples, the processor 602 may combine two or more frames to generate a combined frame in response to an image capture trigger. For example, the processor 602 may combine two or more RGB frames to generate a combined RGB frame with a greater level of detail.

In some examples, the processor 602 may combine visible light data with infrared light data in response to an image capture trigger. For example, the processor 602 may combine one or more RGB frames with one or more infrared frames to render an RGB image with depth information (e.g., by aligning points of the visible light data with corresponding points of the infrared light data to generate an image combining visible light data from the one or more RGB frames and infrared light data from the one or more infrared frames). In some such examples, the processor 602 may cause the actuator 620 to position the mechanical filter 618 in the second position to collect the visible light data for the one or more RGB frames and cause the mechanical filter 618 to be in the first position to collect the infrared light data for the one or more infrared frames. In some examples, the processor 602 may cause the actuator 620 to position the mechanical filter 618 in the first position and then move to the second position, while in other examples, the processor 602 may cause the actuator 620 to position the mechanical filter 618 in the second position and then move to the first position.

In some examples, the processor 602 may cause the actuator 620 to move (e.g., periodically move, aperiodically move, or as a one-time event) the mechanical filter 618 between the first position and the second position. For example, when generating an RGB animation (e.g., a color-sensitive application), the processor 602 may cause the actuator 620 to position the mechanical filter 618 in the second position (e.g., to collect visible light data while blocking infrared light data from passing through the optical system 612 to the imaging sensor 616) for a series of frames and periodically cause the actuator 620 to position the mechanical filter 618 to the first position (e.g., to collect infrared light data) for one or more frames. For example, the processor 602 may cause the actuator 620 to move the mechanical filter 618 between the second position and the first position to collect five RGB frames, collect one infrared frame, collect five RGB frames, etc. In this manner, the number of frames collected in the second position (e.g., five RGB frames) and the number of frames collected in the first position (e.g., one infrared frame) provides beneficial color reproduction with periodic depth information. However, it should be appreciated that any number of frames may be collected between moving the mechanical filter 618 from the first position to the second position.

In some examples, when generating an animation in a low-light environment (e.g., a color agnostic animation), the processor 602 may cause the actuator 620 to position the mechanical filter 618 in the first position (e.g., to collect infrared light data) for a series of frames and periodically position the mechanical filter 618 to the second position (e.g., to collect visible light data) for one or more frames. For example, the processor 602 may cause the actuator 620 to move the mechanical filter 618 between the first position and the second position to collect five infrared frames, collect one RGB frame, collect five infrared frames, etc. In this manner, the number of frames collected in the first position (e.g., five infrared frames) and the number of frames collected in the second position (e.g., one RGB frame) provides a color agnostic animation (e.g., a black and white animation) where the quality of the animation is not sensitive to accurate color reproduction.

Accordingly, it should be appreciated that in some examples, the number of frames collected while the mechanical filter 618 is in the first position (e.g., the number of collected infrared frames) and the number of frames collected while the mechanical filter 618 is in the second position (e.g., the number of collected RGB frames) may depend on the type of application (or use case) requesting the generating of the combined image. For example, for a color-sensitive application where the quality of the combined image may be sensitive to the quality of color reproduction, the processor 602 may cause the actuator 620 to move the mechanical filter 618 to the second position to collect more frames (e.g., RGB frames) than frames collected while the mechanical filter 618 is positioned in the first position (e.g., to collect infrared frames). In contrast, for a color agnostic application where the quality of the combined image may not be sensitive to the quality of color reproduction, the processor 602 may cause the actuator 620 to move the mechanical filter 618 to the first position to collect more frames (e.g., infrared frames) than frames collected while the mechanical filter 618 is positioned in the second position (e.g., to collect RGB frames).

Returning to the image capture device 600 of FIG. 6, in some examples, the image capture device 600 may be an always-on camera. An always-on camera is a camera that can continuously capture images at a given sampling rate or that is always available for capturing images, which can be used in various applications. It should be appreciated that in some examples, many images captured by the always-on camera may have little or no value. For example, while the image capture device 600 is operating in a sleep mode, images captured by the always-on camera may have little or no value.

In some examples, when the image capture device 600 is operating in the sleep mode, the processor 602 may cause the actuator 620 to move the mechanical filter 618 to the first position to collect infrared frames. In some such examples, the collected infrared frames may be low resolution infrared frames. For example, if the imaging sensor 616 is the RGBIR sensor 350 of FIG. 3B, the infrared frames may be quarter-size infrared frames. However, it should be appreciated that in other examples, the low resolution infrared frames may be a lower resolution. In some examples, the collected low resolution infrared frames may be discarded.

In some examples, when the image capture device 600 detects motion (e.g., via a sensor, such as an accelerator, a gyroscope, etc., of the image capture device 600), the image capture device 600 may transition to collecting visible light data and infrared light data. For example, the processor 602 may cause the actuator 620 to keep the mechanical filter 618 in the first position to collect visible light data and infrared light data. In some examples, the image capture device 600 may use the visible light data and/or the infrared light data to, for example, unlock the device. For example, based on different user authentication techniques employed by the image capture device 600, the processor 602 may be configured to generate color images and/or infrared images. In some examples, the processor 602 may generate full resolution color images and/or full resolution infrared images. In some examples, the processor 602 may generate low resolution color images (e.g., by not generating visible light data for locations of the imaging pixel associated with missing pixels (e.g., the pixels of the imaging sensor associated with infrared pixels) and/or low resolution infrared images (e.g., by discarding the visible light data and using the quarter-size infrared image).

In some examples, after the image capture device 600 is unlocked, when the image capture device 600 detects a color-sensitive application requesting an image, the processor 602 may cause the actuator 620 to move the mechanical filter to the first position to the second position to block infrared light from passing through the optical system 612 and reaching the imaging sensor 616. The image capture device 600 may then generate combined images and/or full resolution RGB images based on the techniques disclosed herein.

Figure 13:
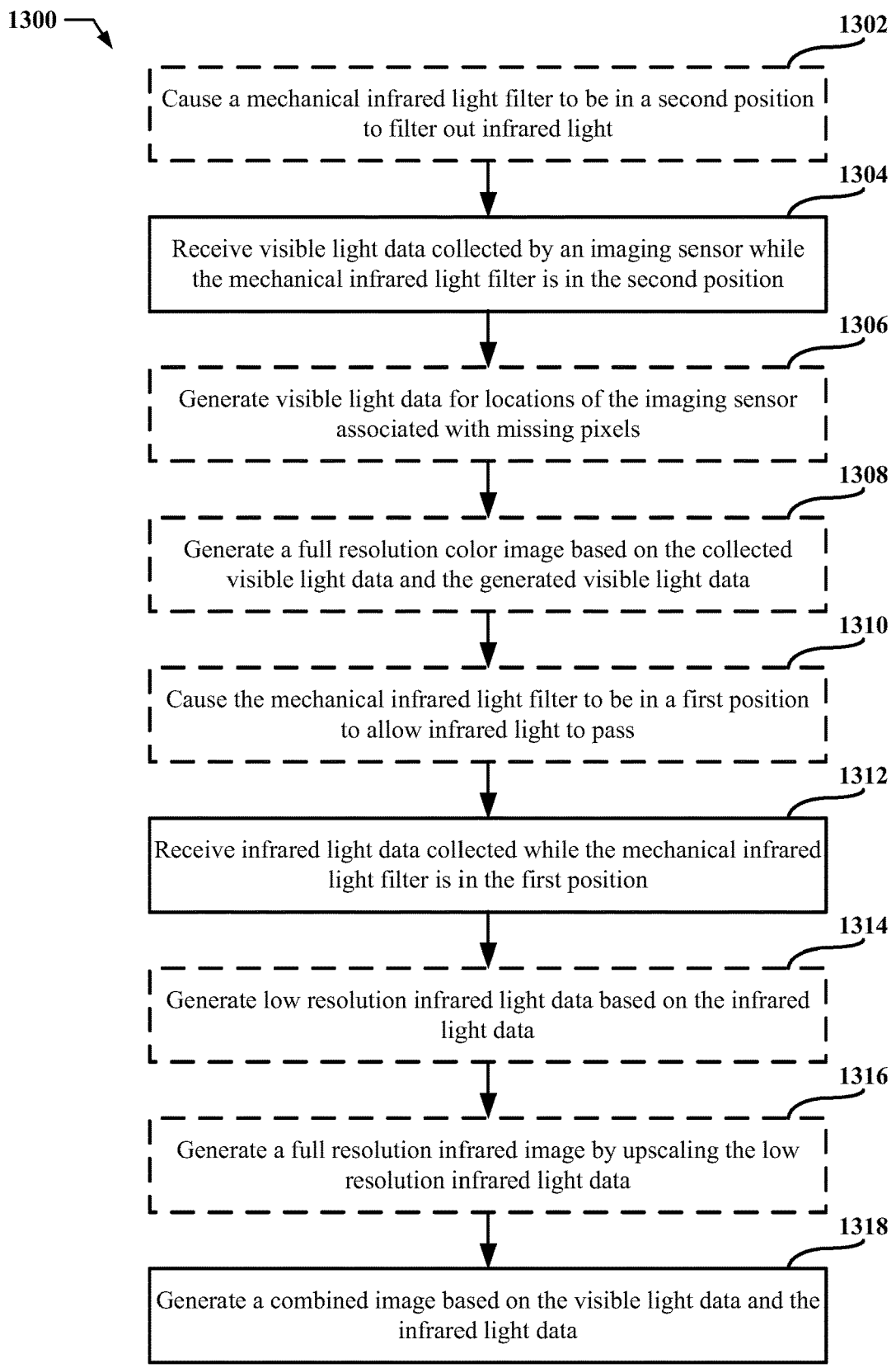
FIGS. 13 and 14 illustrate example flowcharts of example methods, in accordance with certain aspects of this disclosure.

FIG. 13 illustrates an example flowchart 1300 of an example method in accordance with one or more techniques disclosed herein. The method may be performed by an apparatus, such as the example image capture device 600 of FIG. 6, and/or a component of the apparatus, such as the example processor 602 of FIG. 6. In the illustrated example of FIG. 13, the apparatus is configured to include an infrared light filter, such as the example optical system 700 of FIGS. 7A and 7B. Optional aspects are illustrated with a dashed line.

At 1302, the apparatus may cause a mechanical infrared light filter to be in a second position to filter out infrared light, as described in connection with the examples in FIGS. 1 to 11 and/or 12. For example, the processor 602 may cause the mechanical filter 612 to move to the on position (e.g., via the actuator 620) to block infrared light from passing through the optical system 612 and to allow visible light to pass through the optical system 612 (as shown in FIG. 7B). In some examples, the processor 602 may cause the actuator 620 to move the mechanical filter 612 to the on position and for a duration based on a type of application triggering the generating of an image. For example, for a color-sensitive application, the processor 602 may cause the mechanical filter 612 to be in the second position for a relatively longer time than in the first position (e.g., to collect relatively more RGB frames than infrared frames).

At 1304, the apparatus may receive visible light data collected by an imaging sensor while the mechanical infrared light filter is in the second position, as described in connection with the examples in FIGS. 1 to 11 and/or 12. For example, the processor 602 may receive the first light data 812 including visible light data collected by the imaging pixels 354 of the RGBIR sensor 350.

At 1306, the apparatus may generate visible light data for locations of the imaging sensor associated with missing pixels, as described in connection with the examples in FIGS. 1 to 11 and/or 12. For example, the processor 602 may perform interpolation to generate visible light data for the locations of the RGBIR sensor 350 associated with the infrared pixels 356 based on the visible light data collected via the imaging pixels 354.

At 1308, the apparatus may generate a full resolution color image based on the collected visible light data and the generated visible light data, as described in connection with the examples in FIGS. 1 to 11 and/or 12. For example, the processor 602 may combine the visible light data collected via the imaging pixels 354 and the visible light data generated for the missing pixels and generate full resolution visible light data. In some examples, the apparatus may combine two or more frames of full resolution visible light data to generate a combined full resolution visible light data. For example, the apparatus may align corresponding points of the two or more frames of full resolution visible light data to improve robustness of the generated full resolution color image.

At 1310, the apparatus may cause the mechanical infrared light filter to be in a first position to allow infrared light to pass, as described in connection with the examples in FIGS. 1 to 11 and/or 12. For example, the processor 602 may cause the mechanical filter 612 to move to the off position (e.g., via the actuator 620) to allow infrared light to pass through the optical system 612 (as shown in FIG. 7A). In some examples, the processor 602 may cause the mechanical filter 612 to move to the off position and for a duration based on a type of application triggering the generating of an image. For example, for a color agnostic application, the processor 602 may cause the mechanical filter 612 to be in the first position for a relatively longer time than in the second position (e.g., to collect relatively more infrared frames than RGB frames).

At 1312, the apparatus may receive infrared light data collected while the mechanical infrared light filter is in the first position, as described in connection with the examples in FIGS. 1 to 11 and/or 12. For example, the processor 602 may receive the second light data 822 including visible light data collected by the imaging pixels 354 and infrared light data collected by the infrared pixels 356.

At 1314, the apparatus may generate low resolution infrared light data based on the infrared light data, as described in connection with the examples in FIGS. 1 to 11 and/or 12. For example, the processor 602 may discard visible light data collected via the imaging pixels 354 and use the infrared light data collected via the infrared pixels 356 to generate the low resolution infrared light data.

At 1316, the apparatus may generate a full resolution infrared image by upscaling the low resolution infrared light data, as described in connection with the examples in FIGS. 1 to 11 and/or 12. For example, the processor 602 may use the full resolution visible light data to perform guided upsampling of the low resolution infrared light data to generate the full resolution infrared light data. In some examples, the apparatus may align points of the full resolution color image to corresponding points of the low resolution infrared light data to generate the full resolution infrared image. In some examples, the apparatus may upscale the full resolution infrared image by, for example, enhancing and/or correcting edges of the full resolution infrared image based on, for example, changes in color of the full resolution color image to identify edges and other portions of the full resolution infrared image.

At 1318, the apparatus may generate a combined image based on the visible light data and the infrared light data, as described in connection with the examples in FIGS. 1 to 11 and/or 12. For example, the processor 602 may combine one or more RGB frames and one or more infrared frames to generate the combined image. In some examples, the apparatus may align points of the one or more RGB frames to corresponding points of the one or more infrared frames to generate the combined image. In some such examples, the combined image may be an RGB image with depth information.

Figure 14:
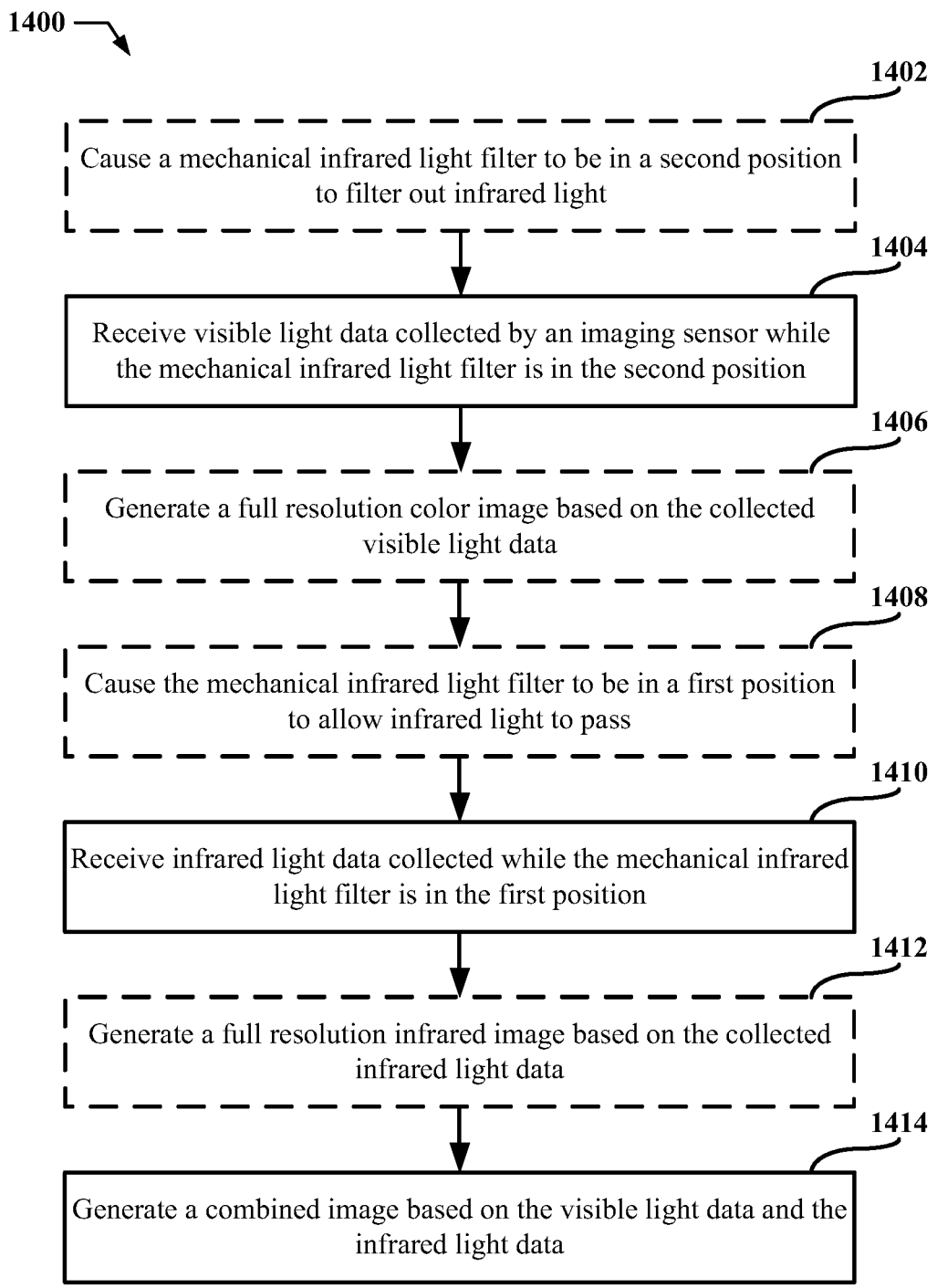

FIG. 14 illustrates an example flowchart 1400 of an example method in accordance with one or more techniques disclosed herein. The method may be performed by an apparatus, such as the example image capture device 600 of FIG. 6, and/or a component of the apparatus, such as the example processor 602 of FIG. 6. In the illustrated example of FIG. 13, the apparatus is configured to include an infrared light filter and a visible light filter, such as the example optical system 1000 of FIGS. 10A and 10B. Optional aspects are illustrated with a dashed line.

At 1402, the apparatus may cause a mechanical infrared light filter to be in a second position to filter out infrared light, as described in connection with the examples in FIGS. 1 to 11 and/or 12. For example, the processor 602 may cause the mechanical filter 612 to move to a position so that infrared light filter 1002a is in the on position (e.g., the second position) and the visible light filter 1002b is in the off position (e.g., the third position) (as shown in FIG. 10B). In some examples, the processor 602 may cause the mechanical filter 612 to move to the first position and for a duration based on a type of application triggering the generating of an image. For example, for a color-sensitive application, the processor 602 may cause the mechanical filter 612 to be in the second position for a relatively longer time than in the first position (e.g., to collect relatively more RGB frames than infrared frames).

At 1404, the apparatus may receive visible light data collected by an imaging sensor while the mechanical infrared light filter is in the second position, as described in connection with the examples in FIGS. 1 to 11 and/or 12. For example, the processor 602 may receive the first light data 1112 including visible light data collected by the imaging pixels 304 of the RGB sensor 300.

At 1406, the apparatus may generate a full resolution color image based on the collected visible light data, as described in connection with the examples in FIGS. 1 to 11 and/or 12. For example, the processor 602 may use the visible light data collected by the imaging pixels 304 to generate the full resolution color image. In some examples, the apparatus may combine two or more frames of full resolution visible light data to generate the combined full resolution color image by, for example, aligning corresponding points of the two or more frames of full resolution visible light data.

At 1408, the apparatus may cause the mechanical infrared light filter to be in a first position to allow infrared light to pass, as described in connection with the examples in FIGS. 1 to 11 and/or 12. For example, the processor 602 may cause the mechanical filter 612 to move to a position so that the infrared light filter 1002a is in the off position (e.g., the first position) and the visible light filter 1002b is in the on position (e.g., the fourth position) (as shown in FIG. 10A). In some examples, the processor 602 may cause the mechanical filter 612 to move to the first position and for a duration based on a type of application triggering the generating of an image. For example, for a color agnostic application, the processor 602 may cause the mechanical filter 612 to be in the first position for a relatively longer time than in the second position (e.g., to collect relatively more infrared frames than RGB frames).

At 1410, the apparatus may receive infrared light data collected while the mechanical infrared light filter is in the first position, as described in connection with the examples in FIGS. 1 to 11 and/or 12. For example, the processor 602 may receive the second light data 1122 including infrared light data collected by the imaging pixels 304.

At 1412, the apparatus may generate a full resolution infrared image based on the collected infrared light data, as described in connection with the examples in FIGS. 1 to 11 and/or 12. For example, the processor 602 may use the infrared light data collected by the imaging pixels 304 to generate the full resolution infrared image.

At 1414, the apparatus may generate a combined image based on the visible light data and the infrared light data, as described in connection with the examples in FIGS. 1 to 11 and/or 12. For example, the processor 602 may combine one or more RGB frames and one or more infrared frames to generate the fused image. In some examples, the apparatus may align points of the one or more RGB frames to corresponding points of the one or more infrared frames to generate the combined image. In some such examples, the combined image may be an RGB image with depth information.

As indicated above, the present disclosure can improve the color reproduction of an image. For example, disclosed techniques may use a mechanical filter that is movable between an on position and an position to change whether an imaging sensor collects visible light data and/or infrared light data. Disclosed techniques also describe processing the collected visible light data and/or the infrared light data to generate respective full resolution visible light data and/or full resolution infrared light data. In some examples, the full resolution visible light data and the full resolution infrared light data may be fused to generate a fused image. In some examples, the position of the mechanical filter and the duration that the mechanical position is in a respective position may vary based on an application type. For example, for color-sensitive applications, disclosed techniques may cause the mechanical filter to be in the on position, while for color agnostic applications, disclosed techniques may cause the mechanical filter to be in the off position.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus including an optical system for generating images, comprising:
    a mechanical infrared light filter movable between a first position and a second position, the mechanical infrared light filter configured to allow infrared light to pass through the optical system while in the first position, and the mechanical infrared light filter configured to filter out infrared light from the optical system while in the second position;
    an imaging sensor including a set of imaging pixels and a set of infrared pixels, the imaging sensor configured to receive light from the optical system; and
    a processor coupled to the imaging sensor and configured to:
        receive an image capture trigger associated with an imaging application type;
        determine, based on the imaging application type, a first number of visible light image frames and a second number of infrared light image frames;
        cause the mechanical infrared light filter to be in the second position to filter out infrared light, in response to the image capture trigger, to receive visible light at the imaging sensor and capture the first number of visible light image frames;
        cause the mechanical infrared light filter to be in the first position to allow infrared light to pass, also in response to the image capture trigger, to receive infrared light at the imaging sensor and capture the second number of infrared light image frames; and generate a combined image associated with the imaging application type based on the first number of visible light image frames and the second number of infrared light image frames.

2. The apparatus of claim 1, wherein the processor is configured to:
cause the mechanical infrared light filter to be in the second position while receiving the first number of visible light image frames; and
cause the mechanical infrared light filter to be in the first position while receiving the second number of infrared light image frames.

3. The apparatus of claim 1, wherein the processor is configured to:
generate visible light data for locations of the imaging sensor associated with the set of infrared pixels, the visible light data associated with a first frame; and
generate a full resolution color image based on the generated visible light data and the received first number of visible light image frames.

4. The apparatus of claim 3, wherein the processor is configured to generate the visible light data via interpolation of the received first number of visible light image frames associated with locations adjacent to the locations of the imaging sensor associated with the set of infrared pixels.

5. The apparatus of claim 3, wherein the processor is configured to:
generate an infrared image based on the received second number of infrared light image frames, the received second number of infrared light image frames associated with a second frame; and
upscale the generated infrared image based on the full resolution color image to generate a full resolution infrared image.

6. The apparatus of claim 5, wherein the processor is configured to generate the infrared image by:
receiving second visible light data and the second number of infrared light image frames associated with the second frame, and
discarding the second visible light data associated with the second frame.

7. The apparatus of claim 5, wherein the processor is configured to generate the combined image by aligning points of the full resolution color image with corresponding points of the full resolution infrared image.

8. The apparatus of claim 1, further comprising:
a mechanical visible light filter movable between a third position and a fourth position, the mechanical visible light filter configured to allow visible light to pass through the optical system while in the third position, and the mechanical visible light filter configured to filter out visible light from the optical system while in the fourth position.

9. The apparatus of claim 8, wherein the processor is configured to:
cause the mechanical infrared light filter to be in the second position and the mechanical visible light filter to be in the third position;
generate a full resolution color image based on the visible light passed through the optical system when the mechanical infrared light filter is in the second position and the mechanical visible light filter is in the third position;
cause the mechanical infrared light filter to be in the first position and the mechanical visible light filter to be in the fourth position; and generate a full resolution infrared image based on the infrared light passed through the optical system when the mechanical infrared light filter is in the first position and the mechanical visible light filter is in the fourth position.

10. The apparatus of claim 9, wherein to generate the combined image, the processor is configured to combine the full resolution color image and the full resolution infrared image by aligning points of the full resolution color image with corresponding points of the full resolution infrared image.

11. The apparatus of claim 1, wherein a ratio between the first number and the second number is based on the imaging application type.

12. A method of operation for generating images, comprising:
receiving, at a processor, an image capture trigger associated with an imaging application type;
determining, based on the imaging application type, a first number of visible light image frames and a second number of infrared light image frames;
causing a mechanical infrared light filter to be in a first position in response to the image capture trigger, the mechanical infrared light filter configured to allow infrared light to pass through to an imaging sensor while in the first position, such that the image sensor receives infrared light and captures the second number of infrared light image frames;
causing the mechanical infrared light filter to be in a second position, also in response to the image capture trigger, the mechanical infrared light filter configured to filter out infrared light from reaching the imaging sensor while in the second position, such that the image sensor receives visible light and captures the first number of visible light image frames, the imaging sensor including a set of imaging pixels and a set of infrared pixels; and
generating a combined image associated with the imaging application type based on the first number of visible light image frames and the second number of infrared light image frames.

13. The method of claim 12, further comprising:
causing the mechanical infrared light filter to be in the second position while receiving the first number of visible light image frames; and
causing the mechanical infrared light filter to be in the first position while receiving the second number of infrared light image frames.

14. The method of claim 12, further comprising:
generating visible light data for locations of the imaging sensor associated with the set of infrared pixels, the visible light data associated with a first frame; and
generating a full resolution color image based on the generated visible light data and the received first number of visible light image frames.

15. The method of claim 14, wherein generating the visible light data is performed via interpolation of the received first number of visible light image frames associated with locations adjacent to the locations of the imaging sensor associated with the set of infrared pixels.

16. The method of claim 14, further comprising:
generating an infrared image based on the received second number of infrared light image frames, the received second number of infrared light image frames data associated with a second frame; and upscaling the generated infrared image based on the full resolution color image to generate a full resolution infrared image.

17. The method of claim 16, wherein generating the infrared image comprises:
receiving second visible light data and the second number of infrared light image frames associated with the second frame, and
discarding the second visible light data associated with the second frame.

18. The method of claim 16, wherein generating the combined image includes aligning points of the full resolution color image with corresponding points of the full resolution infrared image.

19. The method of claim 12, further comprising:
causing the mechanical infrared light filter to be in the second position and a mechanical visible light filter to be in a third position, wherein the mechanical visible light filter is configured to allow visible light to pass through to the imaging sensor while in the third position;
generating a full resolution color image based on the visible light passed through to the imaging sensor when the mechanical infrared light filter is in the second position and the mechanical visible light filter is in the third position;
causing the mechanical infrared light filter to be in the first position and the mechanical visible light filter to be in a fourth position, wherein the mechanical visible light filter is configured to filter out visible light from reaching the imaging sensor while in the fourth position; and
generating a full resolution infrared image based on the infrared light passed through to the imaging sensor when the mechanical infrared light filter is in the first position and the mechanical visible light filter is in the fourth position.

20. The method of claim 19, wherein generating the combined image includes combining the full resolution color image and the full resolution infrared image by aligning points of the full resolution color image with corresponding points of the full resolution infrared image.

21. The method of claim 12, wherein a ratio between the first number and the second number is based on the imaging application type.

22. An apparatus including an optical system for generating images, comprising:
means for receiving an image capture trigger associated with an imaging application type;
means for determining, based on the imaging application type, a first number of visible light image frames and a second number of infrared light image frames;
means for moving a mechanical infrared light filter to a first position in response to the image capture trigger, the mechanical infrared light filter configured to allow infrared light to pass through the optical system while in the first position, such that an imaging sensor receives infrared light from the optical system and captures the second number of infrared light image frames;
means for moving the mechanical infrared light filter to a second position, also in response to the image capture trigger, the mechanical infrared light filter configured to filter out infrared light from the optical system while in the second position, such that the imaging sensor receives visible light from the optical system and captures the first number of visible light image frames, the imaging sensor including a set of imaging pixels and a set of infrared pixels; and
means for generating a combined image associated with the imaging application type based on the first number of visible light image frames and the second number of infrared light image frames.

23. The apparatus of claim 22, further comprising:
means for causing the mechanical infrared light filter to be in the second position while receiving the first number of visible light image frames; and
means for causing the mechanical infrared light filter to be in the first position while receiving the second number of infrared light image frames.

24. The apparatus of claim 22, further comprising:
means for generating visible light data for locations of the imaging sensor associated with the set of infrared pixels, the visible light data associated with a first frame; and
means for generating a full resolution color image based on the generated visible light data and the received first number of visible light image frames.

25. The apparatus of claim 24, further comprising:
means for generating an infrared image based on the received second number of infrared light image frames, the infrared light data associated with a second frame; and
means for upscaling the generated infrared image based on the full resolution color image to generate a full resolution infrared image.

26. The apparatus of claim 25, wherein the means for generating the combined image comprises aligning points of the full resolution color image with corresponding points of the full resolution infrared image.

27. The apparatus of claim 22, further comprising:
means for causing the mechanical infrared light filter to be in the second position and a mechanical visible light filter to be in a third position, wherein the mechanical visible light filter is configured to allow visible light to pass through the optical system while in the third position;
means for generating a full resolution color image based on the visible light passed through the optical system when the mechanical infrared light filter is in the second position and the mechanical visible light filter is in the third position;
means for causing the mechanical infrared light filter to be in the first position and the mechanical visible light filter to be in a fourth position, wherein the mechanical visible light filter is configured to filter out visible light from the optical system while in the fourth position; and
means for generating a full resolution infrared image based on the infrared light passed through the optical system when the mechanical infrared light filter is in the first position and the mechanical visible light filter is in the fourth position.

28. The apparatus of claim 27, wherein the means for generating the combined image is configured to combine the full resolution color image and the full resolution infrared image by aligning points of the full resolution color image with corresponding points of the full resolution infrared image.

* * * * *